(12) United States Patent
Vanam et al.

(10) Patent No.: US 10,917,660 B2
(45) Date of Patent: Feb. 9, 2021

(54) PREDICTION APPROACHES FOR INTRA PLANAR CODING

(71) Applicant: VID SCALE, INC., Wilmington, DE (US)

(72) Inventors: Rahul Vanam, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/477,799

(22) PCT Filed: Jan. 9, 2018

(86) PCT No.: PCT/US2018/012966
§ 371 (c)(1),
(2) Date: Jul. 12, 2019

(87) PCT Pub. No.: WO2018/132380
PCT Pub. Date: Jul. 19, 2018

(65) Prior Publication Data
US 2019/0373285 A1 Dec. 5, 2019

Related U.S. Application Data

(60) Provisional application No. 62/446,354, filed on Jan. 13, 2017.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11); *H04N 19/182* (2014.11); *H04N 19/59* (2014.11)

(58) Field of Classification Search
CPC .... H04N 19/593; H04N 19/59; H04N 19/182; H04N 19/11; H04N 19/105
See application file for complete search history.

(56) References Cited

U.S. PATENT DOCUMENTS

2011/0293001 A1* 12/2011 Lim ............... H04N 19/182
375/240.12
2013/0329794 A1 12/2013 Jeon et al.
2014/0341281 A1 11/2014 Bossen et al.

FOREIGN PATENT DOCUMENTS

EP 2590411 A2 5/2013
WO WO 2014/036174 A2 3/2014

OTHER PUBLICATIONS

ITU, "Information Technology—Digital Compression and Coding of Continuous-Tone Still Images—Requirements and Guidelines" Terminal Equipment and Protocols for Telematic Services, The International Telegraph and Telephone Consultative Committee (CCITT) T.81, Sep. 1992, 186 pages.

(Continued)

*Primary Examiner* — Nam D Pham
(74) *Attorney, Agent, or Firm* — Condo Roccia Koptiw LLP

(57) ABSTRACT

Intra planar approach(es) may be used to predict a pixel(s) in a current block. The current block may be associated with a reconstructed left reference line, a reconstructed top reference line, and an non-reconstructed reference line to be predicted. The reconstructed reference lines may have been decoded and may be available. The non-reconstructed reference lines to be predicted may include an non-reconstructed right and/or an non-reconstructed bottom reference lines. A pivot reference pixel may be identified and may be located on an extension of the reconstructed left and/or top reference lines. A reference pixel may be determined and may be located on the reconstructed top and/or left reference (Continued)

lines. Pixels on the non-reconstructed reference line(s) may be predicted based on the pivot reference pixel and the reference pixel. Pixels of the current block may be predicted using the predicted pixels on the right and the bottom reference lines.

20 Claims, 24 Drawing Sheets

(51) Int. Cl.
*H04N 19/11* (2014.01)
*H04N 19/182* (2014.01)
*H04N 19/59* (2014.01)

(56) References Cited

OTHER PUBLICATIONS

ITU, "Information Technology—Digital Compression and Coding of Continuous-Tone Still Images: Extensions", Terminals for Telematic Services, Telecommunication Standardization Sector of ITU, T.84, Jul. 1996, 84 pages.
Alshina et al., "Known Tools Performance Investigation for Next Generation Video Coding", VCEG-AZ05, ITU—Telecommunications Standardization Sector, Study Group 16 Question 6, Video Coding Experts Group (VCEG), 52nd Meeting, Warsaw, Poland, Jun. 19-26, 2015, 5 pages.
An et al., "Quadtree Plus Binary Tree Structure Integration with JEM Tools", JVET-B0023, MediaTek Inc., Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-6.
Boyce et al., "Draft High Efficiency Video Coding (HEVC) Version 2, Combined Format Range Extensions (RExt), Scalability (SHVC), and Multi-View (MV-HEVC) Extensions", JCTVC-R1013_v1, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 382 pages.
Chen et al., "Chrome Intra Prediction by Reconstructed Luma Samples", JCTVC-C206, Samsung Electronics Co., Ltd., oint Collaborative Team on Video Coding (JCT-VC) of ITU-T SG16 WP3 and ISO/IEC JTC1/SC29/WG11, 3rd Meeting: Guangzhou, CN, Oct. 7-15, 2010, 7 pages.
Chen et al., "Planar Intra Prediction Improvement", JCTVC-F483, Samsung Electronics Co., Ltd., Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-5.
Ikai, Tomohiro, "Cross-Check of JVET-E0068 on Unequal Weight Planar Prediction and Constrained PDPC", JVET-E0117, Sharp Corporation, JVET of ITU-T SG 16 WP 3 and ISO/IEC JTC 1/SC 29/WG 11, 5th Meeting: Geneva, CH, Jan. 12-20, 2017, pp. 1-3.
ISO/IEC, "Information Technology—Generic Coding of Moving Pictures and Associated Audio Information: Video", ISO/IEC 13818-2, Dec. 2000, 220 pages.
ISO/IEC, "Information Technology—Coding of Moving Pictures and Associated Audio for Digital Storage Media at up to About 1,5 Mbit/s—Part 2: Video", ISO/IEC 11172-2:1993, Nov. 2003, 6 pages.
ITU, "Advanced Video Coding for Generic Audiovisual Services", Series H: Audiovisual and Multimedia Systems, Infrastructure of Audiovisual Services—Coding of Moving Video, International Telecommunication Union (ITU), H.264, Nov. 2007, 564 pages.
ITU, "Video Codec for Audiovisual Services at px384kbit/s", CCITT, H.261, Nov. 1988, 14 pages.
ITU-T, "Video Coding for Low Bit Rate Communication", H.263, Series H: Audiovisual and Multimedia Systems, Infrastructure of Audiovisual Services—Coding of Moving Video, Jan. 2005, 226 pages.
JVET, "Joint Exploration Model Reference Software Version 3 (JEM-3.0)", Available at: https://jvet.hhi.fraunhofer.de/svn/svn_HMJEMSoftware/tags/HM-16.6-JEM-3.0/, Retrieved on Jun. 27, 2019, 1 page.
JVET, "Joint Exploration Model Software Version 2 (JEM-2.0)", Available at: https://jvet.hhi.fraunhofer.de/svn/svn_HMJEMSoftware/tags/HM-16.6-JEM-2.0 , Retrieved on Jun. 27, 2019, 1 page.
Lainema et al., "Intra Coding of the HEVC Standard", IEEE Transactions on Circuits and Systems for Video Technology, vol. 22, No. 12, Dec. 2012, pp. 1792-1801.
McCann et al., "High Efficiency Video Coding (HEVC) Test Model 16 (HM 16) Improved Encoder Description", Document: JCTVC-S1002, Joint Collaborative Team on Video Coding (JCT-VC) of ITU-T SG16 WP3 and ISO/IEC JTC1/SC29/WG11, 19th Meeting: Strasbourg, FR, Oct. 17-24, 2014, 54 pages.
Xiu et al., "Decoder—Side Intra Mode Derivation", JVET-C0061, InterDigital Communications Inc., Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-5.

\* cited by examiner

PART_2NX2N

PART_NXN

US 10,917,660 B2

PREDICTION APPROACHES FOR INTRA PLANAR CODING

CROSS-REFERENCE TO RELATED APPLICATIONS

This application is the National Stage Entry under 35 U.S.C. § 371 of Patent Cooperation Treaty Application No. PCT/US2018/012966, filed Jan. 9, 2018, which claims the benefit of U.S. Provisional Application Ser. No. 62/446,354 filed Jan. 13, 2017, the contents of which are incorporated by reference herein.

BACKGROUND

A video coding system may compress digital video signal. For example, a video coding system may compress digital video signal to reduce storage and/or transmission bandwidth for such signal. A video coding system may include, but not limited to, a block-based, a wavelet-based, an object-based system, and/or a block-based hybrid video coding system. Examples of block-based video coding systems may include H.261 (e.g., Moving Picture Experts Group), MPEG-1, MPEG-2, H.263, H.264/Advanced Video Coding (AVC), and/or H.265/High Efficiency Video Coding (HEVC).

SUMMARY

Intra planar coding may be predicted in one or more pixels in a block. For example, a decoder may receive a bitstream having a current block. The current block may include a first reconstructed reference line, a second reconstructed reference line, and a third non-reconstructed reference line (e.g., third unreconstructed reference line) to be predicted. The first reconstructed reference line may include a reconstructed left reference line of the current block, and the second reconstructed reference line may include a reconstructed top reference line of the current block, or vice versa. The first and the second reconstructed reference line may have been encoded and may be available to the decoder. The third non-reconstructed reference line to be predicted may include an non-reconstructed right reference line to be predicted and/or an non-reconstructed bottom reference line to be predicted. The third non-reconstructed reference line to be predicted may not have been encoded and may not be available.

A pixel in the current block may be predicted using one or more predicted pixels on an non-reconstructed reference line. Interpolation may be used to predict one or more pixels within the current block. One or more pixels within the current block described herein may include one or more samples within the current block. The current block may include a prediction unit (PU). The non-reconstructed reference line (e.g., the non-reconstructed right reference line and/or the non-reconstructed bottom reference line) may be predicted. For example, the third non-reconstructed reference line may be predicted by interpolating between one or more reference pixels from the reconstructed left and/or top reconstructed reference lines.

A decoder may detect and/or determine one or more intra planar approaches based on signaling. In examples, an encoder may signal information associated with the use of one or more intra planar approaches in a bitstream. In examples, the decoder may derive the information associated with the use of one or more intra planar approaches based on neighboring reconstructed pixels (e.g., neighboring reconstructed samples). The interpolation prediction approaches may perform a vertical prediction and a horizontal prediction at an angle with respect to the predicted pixel. The combination of one or more of the intra planar approaches and/or the interpolation prediction approaches may be implemented.

A decoder may receive a bitstream. For example, the decoder may receive a bitstream to predict a pixel in a current block. The current block may be associated with one or more reference lines. For example, the current block may be associated with a first reconstructed reference line and/or a second reconstructed reference line. In examples, the first reconstructed reference line may be a reconstructed left reference line of the current block, and the second reconstructed reference line may be a reconstructed top reference line of the current block. The current block may be associated with a third non-reconstructed reference line to be predicted. For example, the third non-reconstructed reference line to be predicted may include an non-reconstructed bottom reference line to be predicted and/or an non-reconstructed right reference line to be predicted.

The decoder may identify a pivot reference pixel. The pivot reference pixel may be located on an extension of the first and/or the second reconstructed reference lines of the current block. In examples, the pivot reference pixel may be located on an extension of the reconstructed left reference line of the current block. In examples, the pivot reference pixel may be located on an extension of the reconstructed top reference row of the current block.

The decoder may predict a plurality of pixels on the third non-reconstructed reference line. In examples, the decoder may predict a plurality of pixels on the non-reconstructed right reference line. In examples, the decoder may predict a plurality of pixels on the non-reconstructed bottom reference line. The decoder may predict a plurality of pixels on the third non-reconstructed reference line based on a plurality of corresponding pixels located on the reconstructed left and/or top reference line and the identified pivot reference pixel.

The decoder may predict a pixel of the current block using the plurality of predicted pixels on the right and/or bottom reference lines associated with the current block.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1:
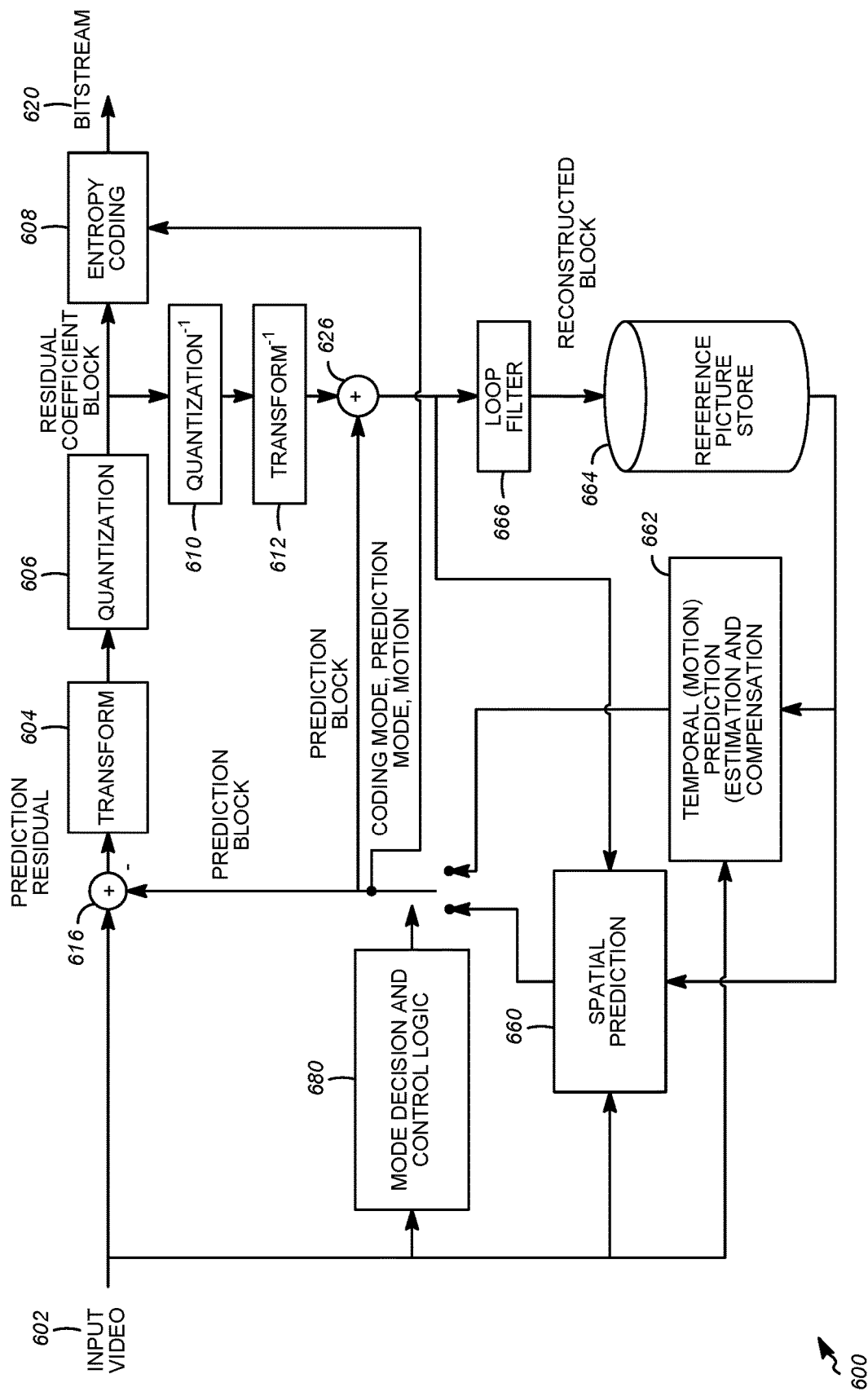
FIG. 1 illustrates an example block-based hybrid video encoder.

FIG. 1 illustrates a block diagram of an example block-based hybrid video encoding system 600. The input video signal 602 may be processed block by block. Extended block sizes (e.g., referred to as a coding unit or CU) may be used (e.g., in HEVC) to compress high resolution (e.g., 1080p and/or beyond) video signals. A CU may have up to 64×64 pixels (e.g., in HEVC). A CU may be partitioned into prediction units or PUs, for which separate predictions may be applied. For an input video block (e.g., a macroblock (MB) or CU), spatial prediction 660 or temporal prediction 662 may be performed. Spatial prediction (e.g., intra prediction) may use pixels from already coded neighboring blocks in the same video picture and/or slice to predict a current video block. Spatial prediction may reduce spatial redundancy inherent in the video signal. Temporal prediction (e.g., referred to as inter prediction or motion compensated prediction) may use pixels from already coded video pictures to predict a current video block. Temporal prediction may reduce temporal redundancy inherent in the video signal. A temporal prediction signal for a given video block may be signaled by a motion vector that indicates the amount and/or direction of motion between the current block and its reference block. If multiple reference pictures are supported (e.g., in H.264/AVC or HEVC), the reference picture index of a video block may be signaled to a decoder. The reference index may be used to identify from which reference picture in a reference picture store 664 the temporal prediction signal may come.

After spatial and/or temporal prediction, a mode decision 680 in the encoder may select a prediction mode, for example based on a rate-distortion optimization. The prediction block may be subtracted from the current video block at 616. Prediction residuals may be de-correlated using a transform module 604 and a quantization module 606 to achieve a target bit-rate. The quantized residual coefficients may be inverse quantized at 610 and inverse transformed at 612 to form reconstructed residuals. The reconstructed residuals may be added back to the prediction block at 626 to form a reconstructed video block. An in-loop filter such as a de-blocking filter and/or an adaptive loop filter may be applied to the reconstructed video block at 666 before it is put in the reference picture store 664. Reference pictures in the reference picture store 664 may be used to code future video blocks. An output video bit-stream 620 may be formed. Coding mode (e.g., inter or intra), prediction mode information, motion information, and/or quantized residual coefficients may be sent to an entropy coding unit 608 to be compressed and packed to form the bit-stream 620.

Figure 2:
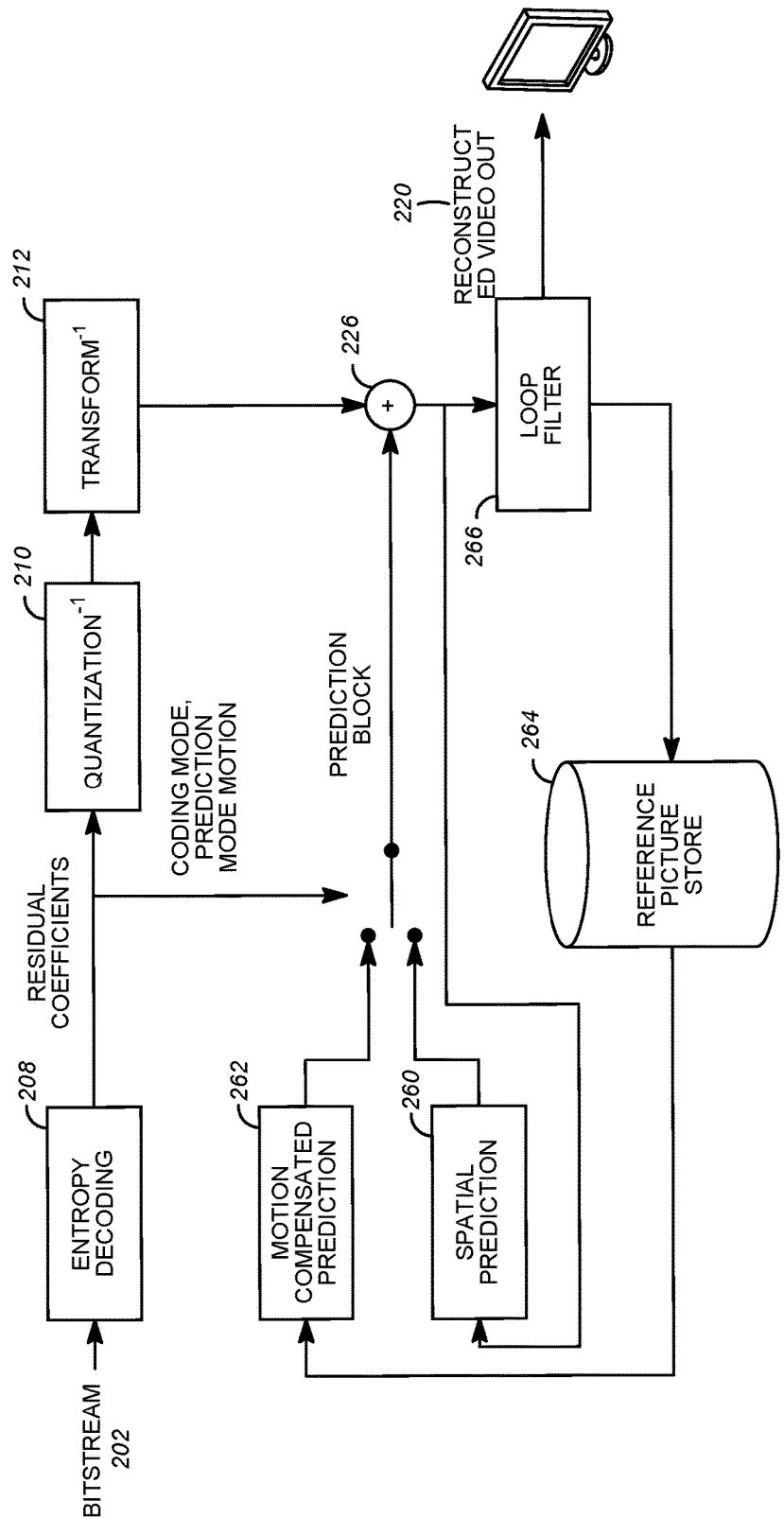
FIG. 2 illustrates an example block-based hybrid video decoder.

FIG. 2 illustrates an example block-based hybrid video decoder. The decoder in FIG. 2 may correspond to the encoder in FIG. 1. A video bit-stream 202 may be received, unpacked, and/or entropy decoded at an entropy decoding unit 208. Coding mode and/or prediction information may be sent to a spatial prediction unit 260 (e.g., if intra coded) and/or to a temporal prediction unit 262 (e.g., if inter coded). A prediction block may be formed the spatial prediction unit 260 and/or temporal prediction unit 262. Residual transform coefficients may be sent to an inverse quantization unit 210 and an inverse transform unit 212 to reconstruct a residual block. The prediction block and residual block may be added at 226. The reconstructed block may go through in-loop filtering 266 and may be stored in a reference picture store 264. Reconstructed videos in the reference picture store 264 may be used to drive a display device and/or to predict future video blocks.

Intra coding may be used in an image and/or video coding technique, such as Joint Photographic Experts Group (JPEG), H.261, MPEG-1, MPEG-2, H.263, H.264/AVC, and/or H.265/HEVC. For example, intra coding may be used to reduce spatial correlation in an image and/or video technique. Directional intra prediction may be used, for example, in H.264/AVC and H.265/HEVC. For example, directional intra prediction may be used in H.264/AVC and H.265/HEVC to improve coding efficiency. Intra prediction modes may utilize a set of reference samples. For example, intra prediction modes may use a set of reference pixels (e.g., reference samples) from above (e.g., or top) and to the left of a current block to be predicted. Reference pixels (e.g., reference samples) may be denoted as $R_{x,y}$. In examples, (x, y) may have its origin one pixel above and to the left of a block's top-left corner. A predicted pixel (e.g., a predicted sample) value at a position (x, y) may be denoted as $P_{x,y}$.

Figure 3:
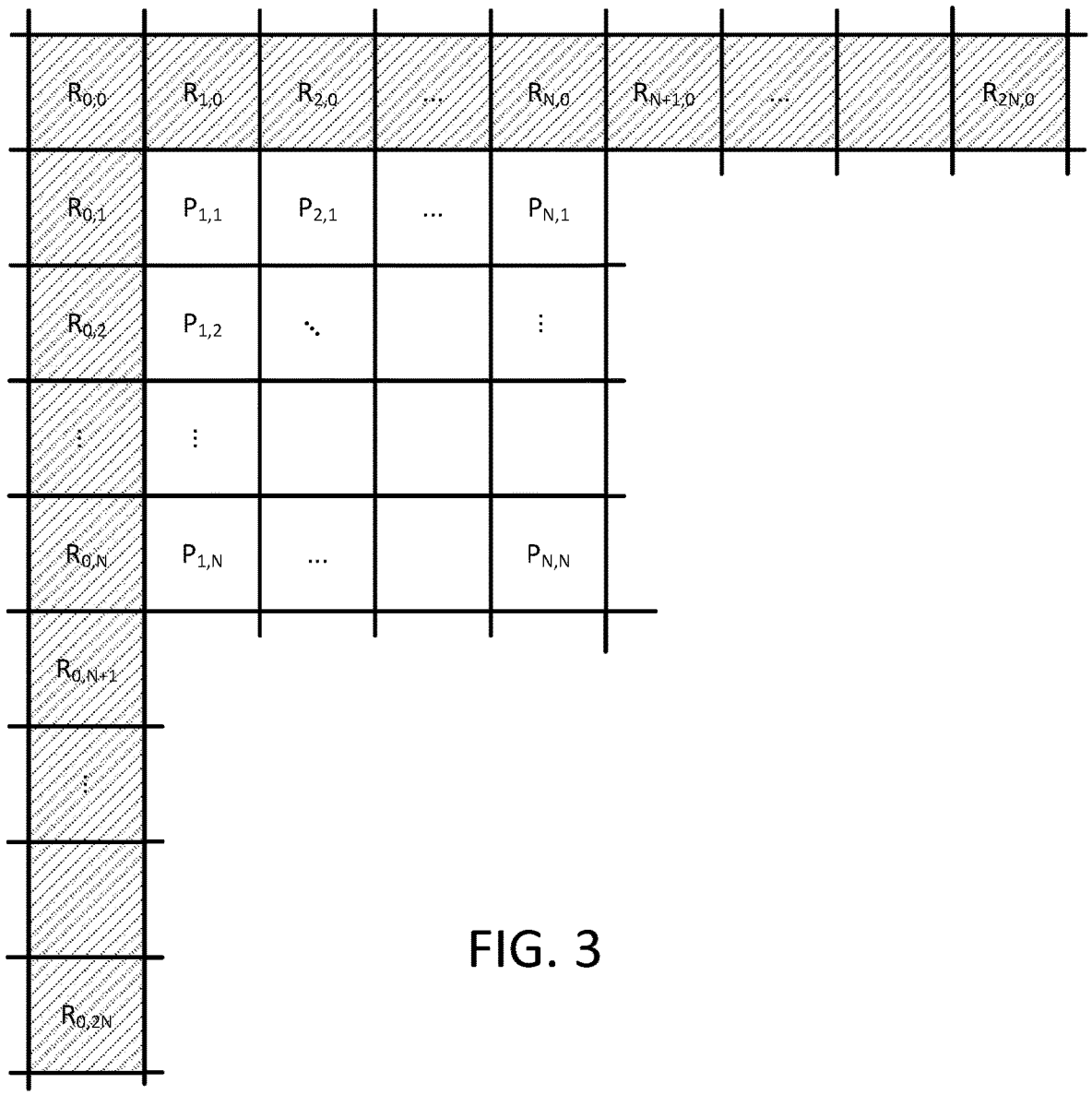
FIG. 3 illustrates examples of reference samples Rx,y used for prediction to obtain predicted samples Px,y for a block size of N×N samples.

FIG. 3 illustrates examples of reference pixels $R_{x,y}$ used for prediction to obtain predicted pixels $P_{x,y}$ for a block size of N×N pixels. In examples, pixels (e.g., reference pixels $R_{x,y}$ and predicted pixels $P_{x,y}$) may be samples (e.g., reference samples and/or predicted samples, respectively) within the block.

Figure 4:
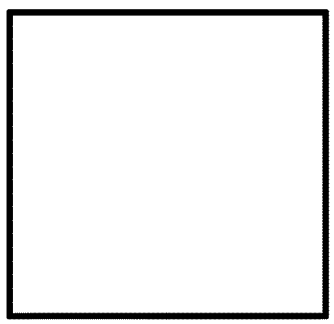
FIG. 4 illustrates examples of partitioning modes for intra coding unit.
Figure 4:
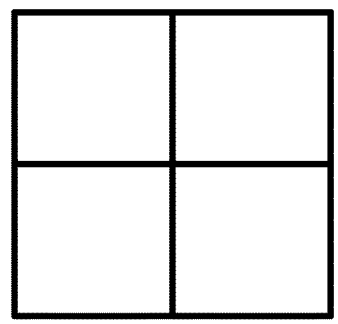

FIG. 4 illustrates examples of partitioning modes for intra prediction unit (PU). HEVC intra coding may support one or more (e.g., multiple) types of PU division. For example, HEVC intra coding may support PART_2N×2N and PART_N×N. PART_2N×2N and PART_N×N may split a coding unit (CU) into one or four equal size PUs, respectively. PART_N×N may be available when a CU size is a configured minimum CU size. For example, the configured minimum CU size may be 8×8.

An 8×8 CU may be split. For example, an 8×8 CU may be split into four 4×4 PUs and may have four luma prediction blocks (PBs), for example, for 4:2:0 chroma formats. One 4×4 PB per chroma channel may exist for intra coded blocks. For example, one 4×4 PB per chroma channel may exist for intra coded blocks to avoid high throughput caused by 2×2 chroma intra PBs.

A CU may be split into multiple transform units (TUs). Intra prediction may be applied to a TU. For example, intra prediction may be applied sequentially to a TU. When a CU is split into one or more (e.g., multiple) TUs, the intra prediction may be applied (e.g., applied sequentially) for a TU in a quad-tree Z scanning order. The intra prediction may be applied for a TU sequentially in a quad-tree Z scanning order, for example, as compared to applying intra prediction at PU level. Sequential intra prediction may allow neighboring reference samples from previous reconstructed TUs that are closer to current TU samples to be coded.

Figure 5:
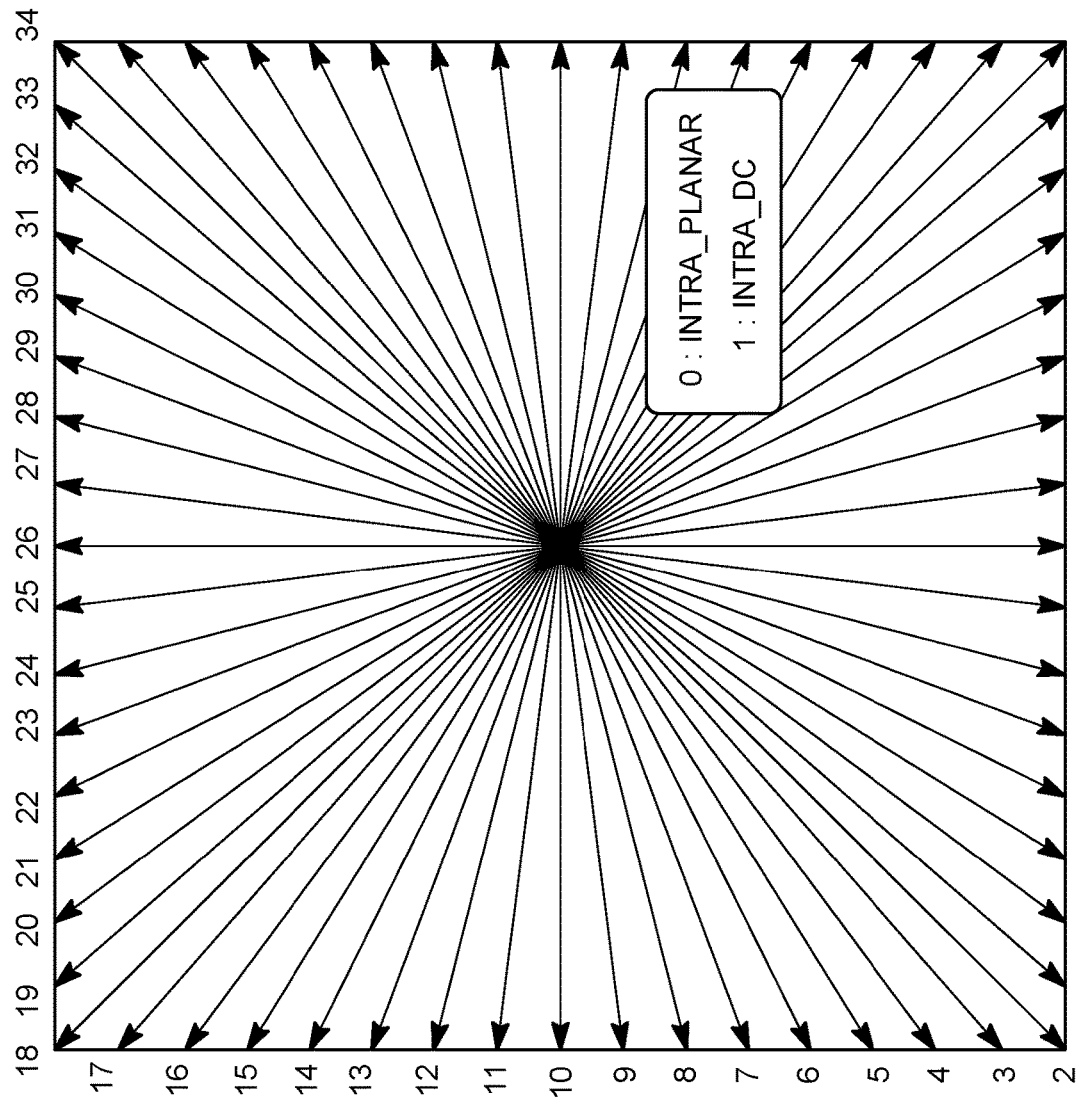
FIG. 5 illustrates examples of angular intra prediction modes.

FIG. 5 illustrates examples of angular intra prediction modes. HEVC may support one or more (e.g., 35) intra prediction modes. For example, HEVC may support a DC mode, a planar mode, and 33 directional (e.g., or angular) intra prediction modes.

Angular intra prediction may be configured to model (e.g., efficiently model) different directional structures in video and/or image content. The number and angularity of prediction directions may be selected to provide a trade-off between encoding complexity and coding efficiency for a video material.

A predicted sample $P_{x,y}$ may be obtained by one or more of the following: projecting its location to a reference line (e.g., row or column) of pixels; applying a selected prediction direction, and/or interpolating a predicted value for the sample at 1/32 pixel accuracy. Interpolation may be performed linearly utilizing the two closest reference samples, e.g., $R_{i,0}$ and $R_{i+1,0}$ for vertical prediction (e.g., mode 18~34 as shown in FIG. 5) and $R_{0,i}$ and $R_{0,i+1}$ for horizontal prediction (e.g., mode 2~17 as shown in FIG. 5).

HEVC may support one or more (e.g., 33) angular prediction mode, planar prediction mode, and/or DC prediction mode for luma intra prediction for one or more (e.g., all) PU sizes. HEVC may define multiple (e.g., three) most probable modes (MPMs) for a PU. For example, HEVC may define three MPMs for a PU based on the modes of the top and left neighboring PUs. A flag may indicate whether the prediction mode of a current block is in the MPM set or not. If the current intra prediction mode is equal to one of the elements in a set of MPMs, an index in the set may be transmitted to the decoder. If the current prediction mode does not match one of the elements in the set of MPMs, a code (e.g., a 5-bit fixed length code) may be used to indicate a selected mode outside the set of MPMs.

Planar mode may be an example prediction of order one. The prediction of order one may use a bilinear model derived from the top and left reference samples for predicting a block. The planar mode operation may include computing two linear predictions. The planar mode operation may average the two linear predictions by using one or more (e.g., all) of Equations (1)~(3) described herein.

$$P_{x,y}^V = (N-y) \cdot R_{x,0} + y \cdot R_{0,N+1} \qquad (1)$$

$$P_{x,y}^H = (N-x) \cdot R_{0,y} + x \cdot R_{N+1,0} \qquad (2)$$

$$P_{x,y} = (P_{x,y}^V + P_{x,y}^H + N) >> (\log_2(N)+1) \qquad (3)$$

Figure 6A:
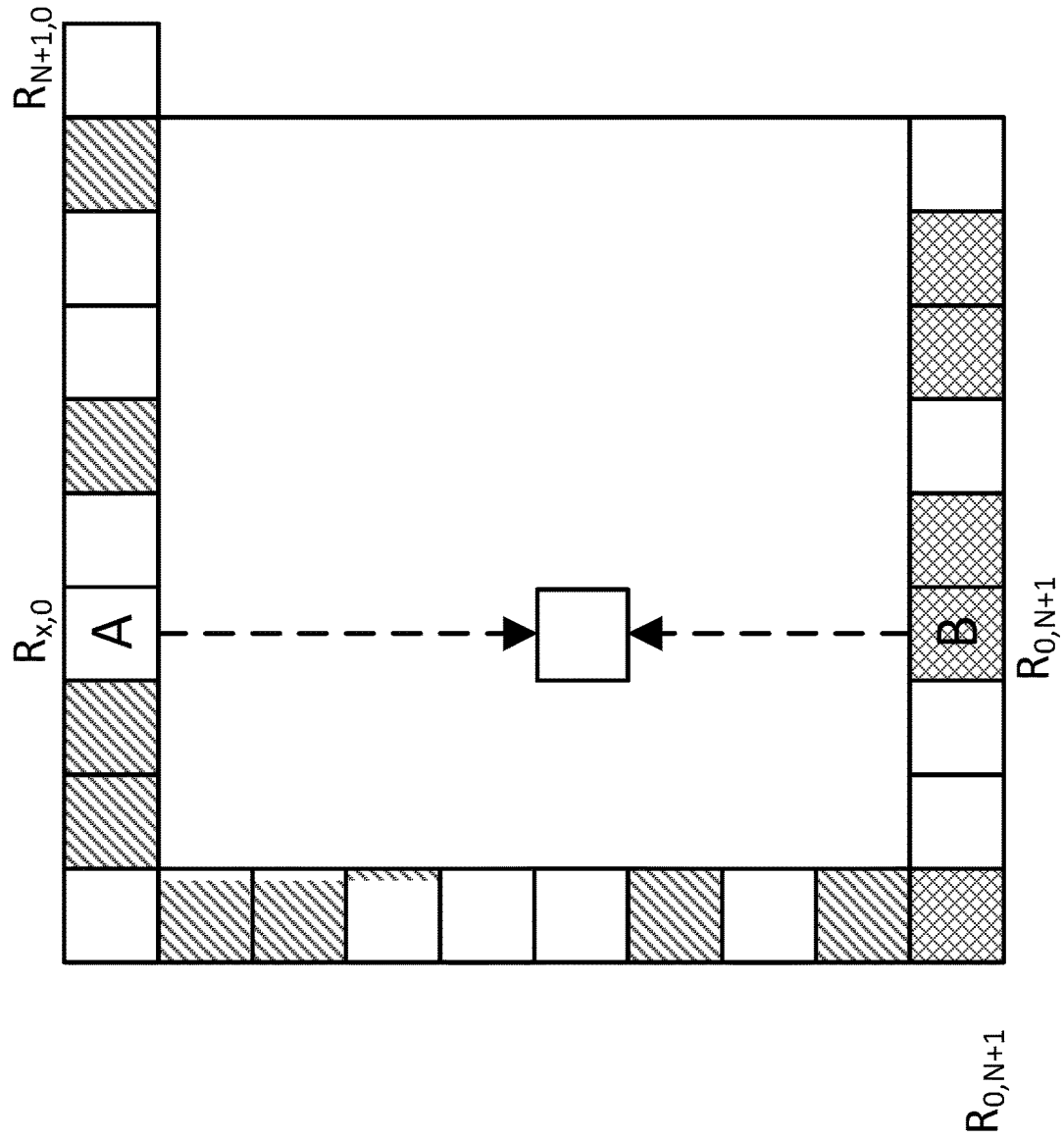
FIG. 6A illustrates an example prediction $P^V_{x,y}$ and $P^H_{x,y}$ in equation (1).

FIG. 6A illustrates an example prediction operation of Equation (1). In examples, the bottom reference line may be obtained by replicating the bottom-left sample $R_{0,N+1}$. In examples, the top and bottom reference lines may be interpolated to generate prediction samples $P_{x,y}^V$ with Equation (1).

Figure 6B:
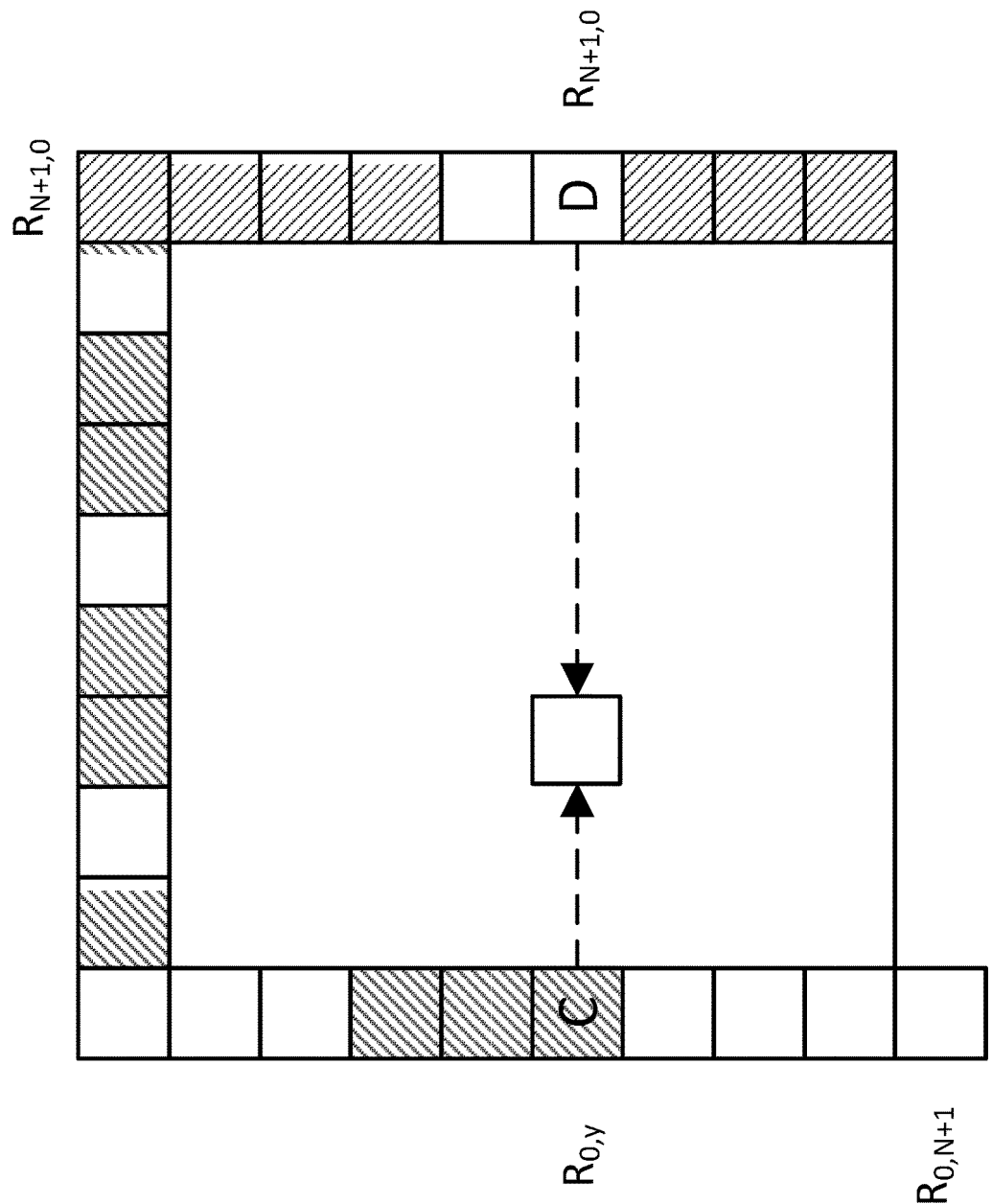
FIG. 6B illustrates an example prediction $P^V_{x,y}$ and $P^H_{x,y}$ in equation (2).

FIG. 6B illustrates an example prediction operation of Equation (2). For example, the right reference line may be generated by replicating the top-right pixel $R_{N+1,0}$. The prediction operation in Equation (2) may involve linear interpolation of the left and right reference lines to generate predictions $P_{x,y}^H$. The two predictions, such as $P_{x,y}^V$ and $P_{x,y}^H$, may be averaged as in Equation (3) to yield the final prediction block.

A filter may be used to smooth a reference sample. In examples, a 3-tap smoothing filter may be applied to one or more (e.g., all) reference samples when an intra_smoothing_disabled_flag parameter is set to 0. Filtering may be controlled, for example, by a given intra prediction mode and/or transform block size. In examples, for 32×32 blocks, one or more (e.g., all) angular modes may use filtered reference samples, except horizontal and vertical angular modes. In examples, for 16×16 blocks, the modes not using filtered reference samples may be extended to four modes (e.g., 9, 11, 25, or 27) closest to horizontal and vertical as shown in FIG. 5. In examples, for 8×8 blocks, diagonal modes (2, 18, or 34) may use filtered reference samples.

Intra prediction may be applied for chroma components. In examples, intra prediction mode may be specified, e.g., as planar, DC, horizontal, vertical, and/or DM_CHROMA mode. Table 1 shows an example mapping between intra prediction mode and intra prediction direction for chroma. For example, Table 1 may provide a rule specifying the chroma component intra prediction mode given the corresponding luma PB intra prediction mode and an intra_chroma_pred_mode syntax element. The intra prediction direction of chroma component may be mapped to diagonal mode (34).

TABLE 1

| | Luma intra prediction direction, X | | | | |
|---|---|---|---|---|---|
| intra_chroma_pred_mode | 0 | 26 | 10 | 1 | Otherwise (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 (DM_CHROMA) | 0 | 26 | 10 | 1 | X |

Table 2 shows an example specification of intra prediction mode for 4:2:2 chroma format. When a DM_CHROMA mode is selected and a 4:2:2 chroma format is in use, an intra prediction mode for a chroma PB may be derived, for example, from an intra prediction mode for the corresponding luma PB as specified in Table 2.

TABLE 2

| intra pred mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| intra pred mode for 4:2:2 chroma | 0 | 1 | 2 | 2 | 2 | 2 | 3 | 5 | 7 | 8 | 10 | 12 | 13 | 15 | 17 | 18 | 19 | 20 |
| intra pred mode | 18 | 19 | 20 | 21 | 22 | 23 | 24 | 25 | 26 | 27 | 28 | 29 | 30 | 31 | 32 | 33 | 34 | |
| intra pred mode for 4:2:2 chroma | 21 | 22 | 23 | 23 | 24 | 24 | 25 | 25 | 26 | 27 | 27 | 28 | 28 | 29 | 29 | 30 | 31 | |

Figure 7:
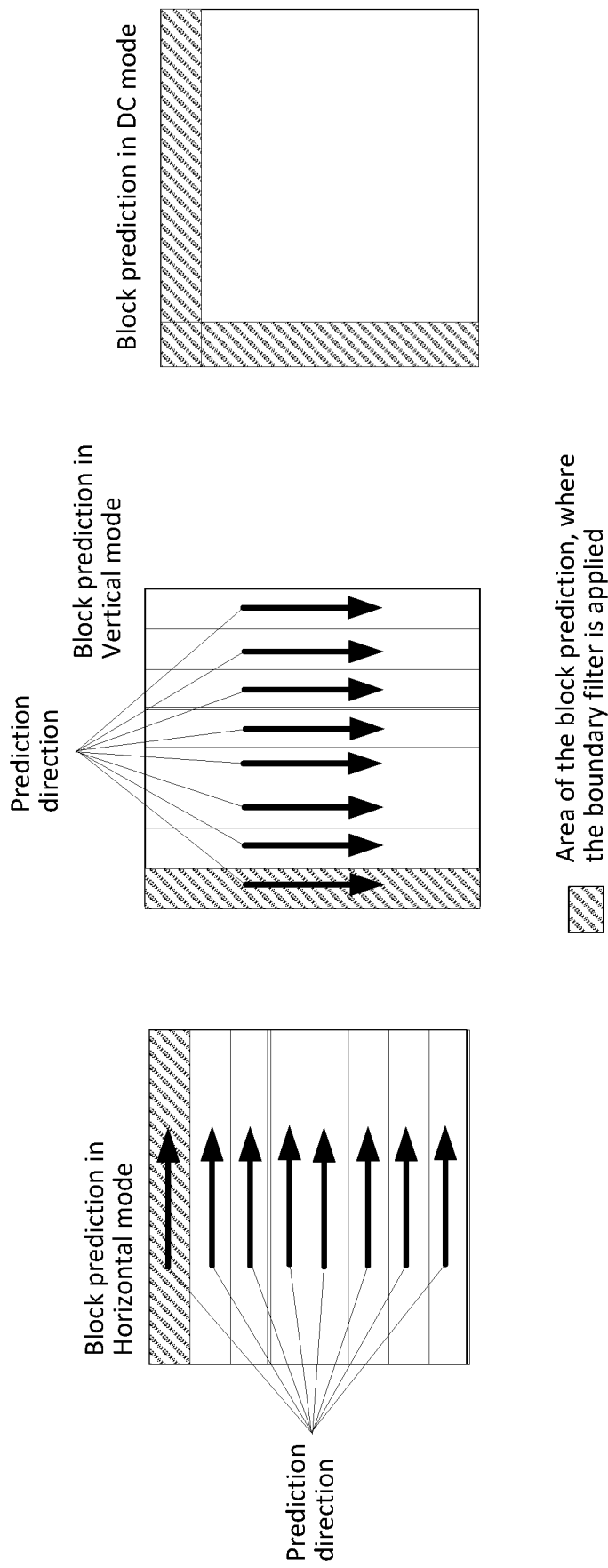
FIG. 7 illustrates an example intra boundary filter.

FIG. 7 illustrates an example intra boundary filter. An intra-boundary filter may be used when reconstructing intra-predicted transform blocks (TBs). For example, when reconstructing intra-predicted TBs, an intra-boundary filter may be used to filter predicted luma samples along the left and/or top edges of the TB for PBs using horizontal, vertical, and/or DC intra prediction modes, e.g., as shown in FIG. 7. Intra boundary filters may be applied to boundary samples within the current TB (e.g., unlike the reference sample smoothing filters described herein).

An intra boundary filter may be defined, for example, with respect to an array of predicted samples p as input and predSamples as output.

For horizontal intra-prediction applied to luma transform blocks of size (nTbS) less than 32×32 and boundary filtering is enabled (e.g., disableIntraBoundaryFilter may be equal to 0), the following filtering may apply where x=1 . . . nTbS, y=1:

$$predSamples_{x,y}=Clip1_Y(P_{0,y}+((P_{x,0}-P_{0,0})>>1)) \quad (4)$$

For vertical intra-prediction applied to luma transform blocks of size (nTbS) less than 32×32 and disableIntraBoundaryFilter is equal to 0, the following filtering may apply where x=1 . . . nTbS, y=1:

$$predSamples_{x,y}=Clip1_Y(P_{x,0}+((P_{0,y}-P_{0,0})>>1)) \quad (5)$$

For DC intra-prediction applied to luma transform blocks of size (nTbS) less than 32×32, the following filtering may apply where x=1 . . . nTbS and y=1 and a DC predictor dcVal:

$$predSamples_{1,1}=(P_{0,1}+2*dcVal+P_{1,0}+2)>>2 \quad (6)$$

$$predSamples_{x,1}=(P_{x,0}+3*dcVal+2)>>2, \text{with } x=2 \ldots nTbS \quad (7)$$

$$predSamples_{1,y}=(P_{0,y}+3*dcVal+2)>>2, \text{with } y=2 \ldots nTbS \quad (8)$$

An improvement may be provided by boundary smoothing, e.g., 0.4% average improvement. An intra boundary filter may be applied on a luma component as the prediction for chroma components tends to be smooth.

Intra mode residual coding may utilize intra mode dependent transforms and/or coefficient scanning to code residual information. A discrete sine transform (DST) may be selected for 4×4 luma blocks. A discrete cosine transform (DCT) may be selected/used for other types of blocks.

A linear-model (LM) based chroma intra prediction mode may be used, for example, to predict chroma samples from collocated reconstructed luma samples using a linear model (LM), e.g., in accordance with Equation (9):

$$Pred_C[x,y]=\alpha \cdot Rec_L[x,y]+\beta \quad (9)$$

where $Pred_C$ may indicate predicted chroma samples in a block, and $Rec_L$ may indicate corresponding reconstructed luma samples in a block. Parameters $\alpha$ and $\beta$ may be derived from causal reconstructed luma and chroma samples around a current block.

Figure 8:
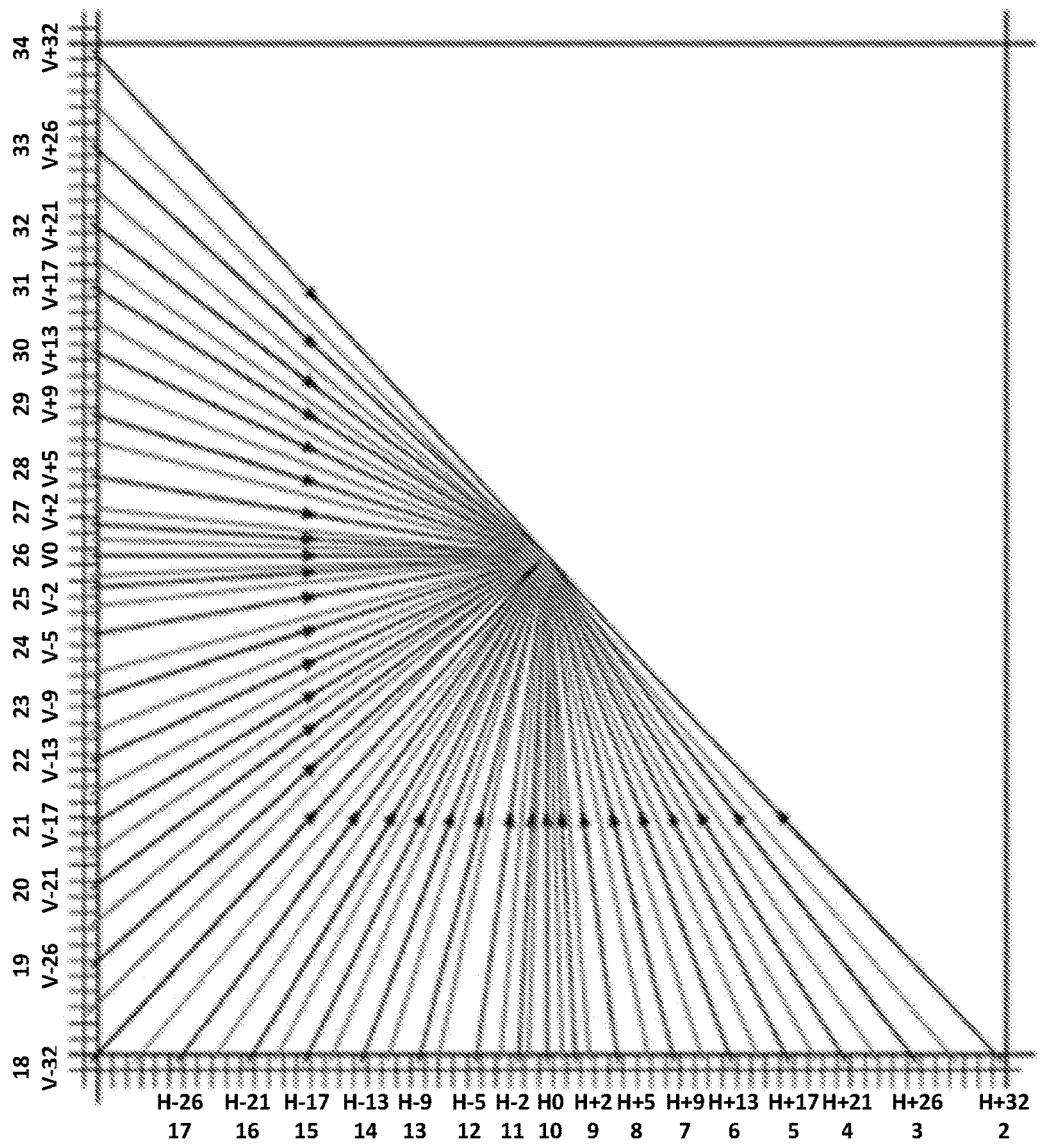
FIG. 8 illustrates examples of intra mode prediction directions.

FIG. 8 illustrates examples of intra mode prediction directions. The arrowed lines may correspond to intra mode directions. The arrowed lines may be a subset of modes. The numbers may represent the mode numbers.

In intra planar mode, a pixel within a current block may be predicted (e.g., interpolated) using reference pixels. A pixel within a current block may include a sample within the current block. The current block may include PU. The reference pixels may be located along the reconstructed reference line of the current block. For example, the reconstructed reference line may be include a reconstructed left reference line (e.g., a vertical line on the current block) and/or a reconstructed top reference line (e.g., a horizontal line on the current block) and may be referred to a first and a second reference lines, respectively. The reference pixels may be located on the adjoining block of the current block. For example, the reference pixels may be located on left and right, and top and bottom boundaries. The right and bottom neighboring blocks may not have been encoded and may not be available. The associated right reference line and the bottom reference line may not be available. In examples, the associated bottom reference line and the right reference line may be predicted by replicating the samples on the bottom-left and top-right of the pixels, respectively, as shown in FIGS. 6A and 6B.

Interpolation prediction approaches may be used to generate one or more pixels within a current block. For example, vertical and/or horizontal predictions may be performed. Vertical and/or horizontal predictions may be performed using Equations (1) and (2) and may be illustrated in FIGS. 6A and 6B, respectively. Vertical and/or horizontal predictions may generate one or more pixels within the current block. The vertical and horizontal predictions may process reference pixels along the cardinal directions. In examples, vertical prediction may be performed using pixels 'A' and 'B,' as shown in FIG. 6A. In examples, horizontal prediction may be performed using pixels 'C' and 'D,' as shown in FIG. 6B. The position of the reference pixels may be oriented along an angle with respect to the predicted pixel.

Intra planar prediction approaches may be used to predict an non-reconstructed right reference line and/or an non-reconstructed bottom reference line. For example, the non-reconstructed right and/or bottom reference lines to be predicted may be referred to as a third reference line to be predicted. The third reference line to be predicted may include a right reference line to be predicted and/or a bottom reference line to be predicted. For example, the non-reconstructed right reference line and the non-reconstructed bottom reference line may be predicted by replicating the top-right and bottom-left reference pixels, respectively, as illustrated in FIGS. 6B and 6A. The non-reconstructed right reference line and the non-reconstructed bottom reference line may be predicted based on interpolating pixels from the reconstructed left reference line and the reconstructed top reference line.

One or more pixels within the current block and the non-reconstructed right and/or bottom reference line(s) may be predicted based on the combination of interpolation prediction approaches and intra planar prediction approaches described herein.

An indication of intra planar prediction approach(es) may be used to code the current block and may be signaled. For example, interpolation prediction approaches and/or intra planar prediction approaches described herein may be signaled explicitly by an encoder and/or signaled to a decoder. Information regarding the interpolation prediction approaches and/or intra planar prediction approaches described herein may be derived by the encoder and/or the decoder.

Figure 9:
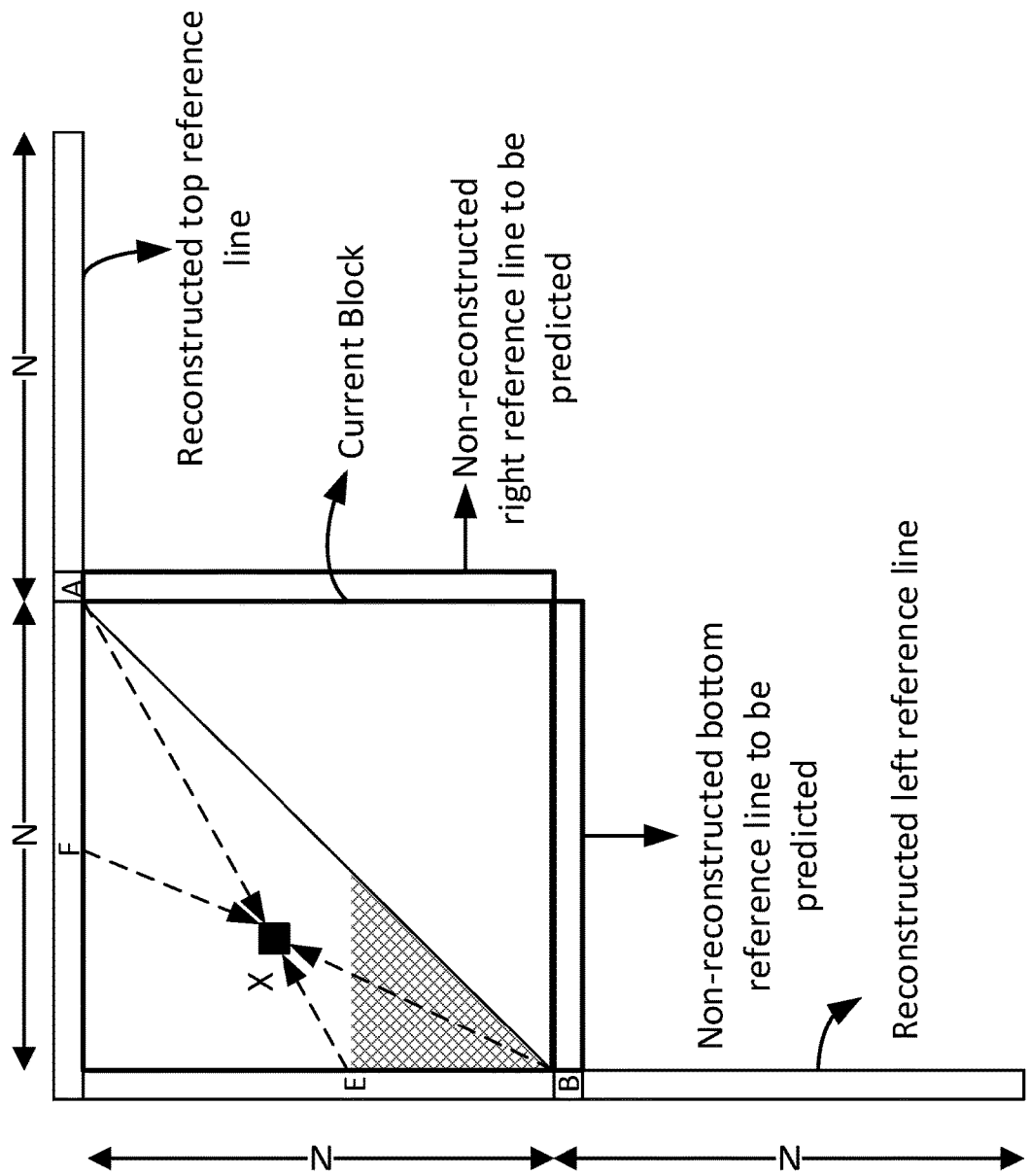
FIG. 9 illustrates an example intra planar approach to predict an upper triangular region (hatched region).

One or more intra planar prediction approaches may perform vertical and/or horizontal predictions. A block (e.g., current block), for example, may have a N×N size. The current block may be associated with reference pixels from the adjoining top and left reference lines. The adjoining top and left reference lines may be derived from the adjoining block, as shown in FIG. 9. The adjoining left and top reference lines may be an extension of the current block. In examples, the adjoining left reference line may be an extension of the reconstructed left reference line of the current block. In examples, the adjoining top reference line may be an extension of the reconstructed top reference line of the current block.

One or more pixels in a block (e.g., current block) may be predicted. For example, one or more pixels in a current block may be predicted (e.g., interpolated) based on a pixel from predicted pixels on a non-reconstructed right and/or bottom reference line(s) using one or more (e.g., all) of Equations (1)~(3). This prediction approach may be referred to as Approach-0. For example, the intra planar approach may perform vertical and/or horizontal predictions based on Equations (1) and (2), as illustrated in FIGS. 6A and 6B, respectively. The vertical and the horizontal predictions may process reference pixels along the cardinal directions (e.g., pixels 'A' and 'B' for vertical prediction and pixels 'C' and 'D' for horizontal prediction).

FIG. 9 illustrates an example of an intra planar approach (e.g., Approach-1) to predict an upper triangular region (e.g., shown in hatched region). The reference pixels may be oriented along an angle with respect to the predicted pixel. For example, the current block may be divided into two regions: an upper and a lower triangular region as illustrated in FIG. 9. Pixels belonging to the upper triangular region may be predicted using the prediction approach described herein (e.g., Approach-1). One or more pixels located on the lower triangular region may be predicted (e.g., interpolated), for example, using Approach-0 that use one or more (e.g., all) of Equations (1)~(3).

Pixel 'X' in the upper triangular region of the current block may be predicted (e.g., linearly interpolated) based on pivot reference pixel(s) and reference pixel(s) located on the reconstructed left and/or top reference line(s). For example, reference pixels 'A' and 'B' may be considered as pivots and may be referred as pivot reference pixels. In examples, the pivot reference pixels 'A' and 'B' may be located at top-right and bottom-left pixel of the current block. For example, the pivot reference pixels 'A' and 'B' may be located in two opposing corner of the current block. Given the location of pixels 'X' and 'A,' a straight line may be drawn through pixels 'A' and 'X' to find a corresponding reference pixel on the reconstructed left reference line (e.g., an intercept 'E'). The corresponding reference pixel(s) on the reconstructed left reference line and/or reconstructed top reference line may be referred to as an intercept reference pixel(s). For example, the intercept 'E' may be an intercept reference pixel. The pixel value of the intercept reference pixel 'E' may be determined. In examples, the pixel value at 'E' may be determined by weighted average of adjacent pixels. In examples, the pixel value of the intercept reference pixel 'E' may be determined by linear interpolation. Pixel value at 'X' may be predicted based on the pivot reference pixel and the intercept reference pixel. In examples, the pixel value at 'X' may be estimated based on the respective distances of pixels 'A' and 'E.' In examples, the pixel value at 'X' may be estimated by weighted average of pixels 'A' and 'E.' In examples, the pixel value at 'X' may be estimated by linear interpolation. The weighted average value of pixels 'A' and 'E' may be $X_1$.

Similarly, a straight line may be drawn through pixels 'B' and 'X' to find an intercept reference pixel 'F' on the reconstructed top reference line. The intercept reference pixel value of 'F' may be determined. In examples, the pixel value of the intercept reference pixel 'F' may be determined by weighted average of adjacent pixels. In examples, the pixel value of the intercept reference pixel 'F' may be determined by linear interpolation. The pixel value at 'X' may be estimated based on the pivot reference pixel and the intercept reference pixel. In examples, the pixel value at 'X' may be estimated based on the respective distances of pixels 'B' and 'F.' In examples, the pixel value at 'X' may be estimated by weighted average of pixels 'B' and 'F.' In examples, the pixel value at 'X' may be estimated by linear interpolation. The weighted average value of pixels 'B' and 'F' may be $X_2$. The pixel value at 'X' may be computed. For example, the pixel value at 'X' may be computed based on the average of $X_1$ and $X_2$. The intra planar approach of performing vertical and horizontal predictions for the upper triangular region described herein may be referred to as Approach-1.

Figure 10:
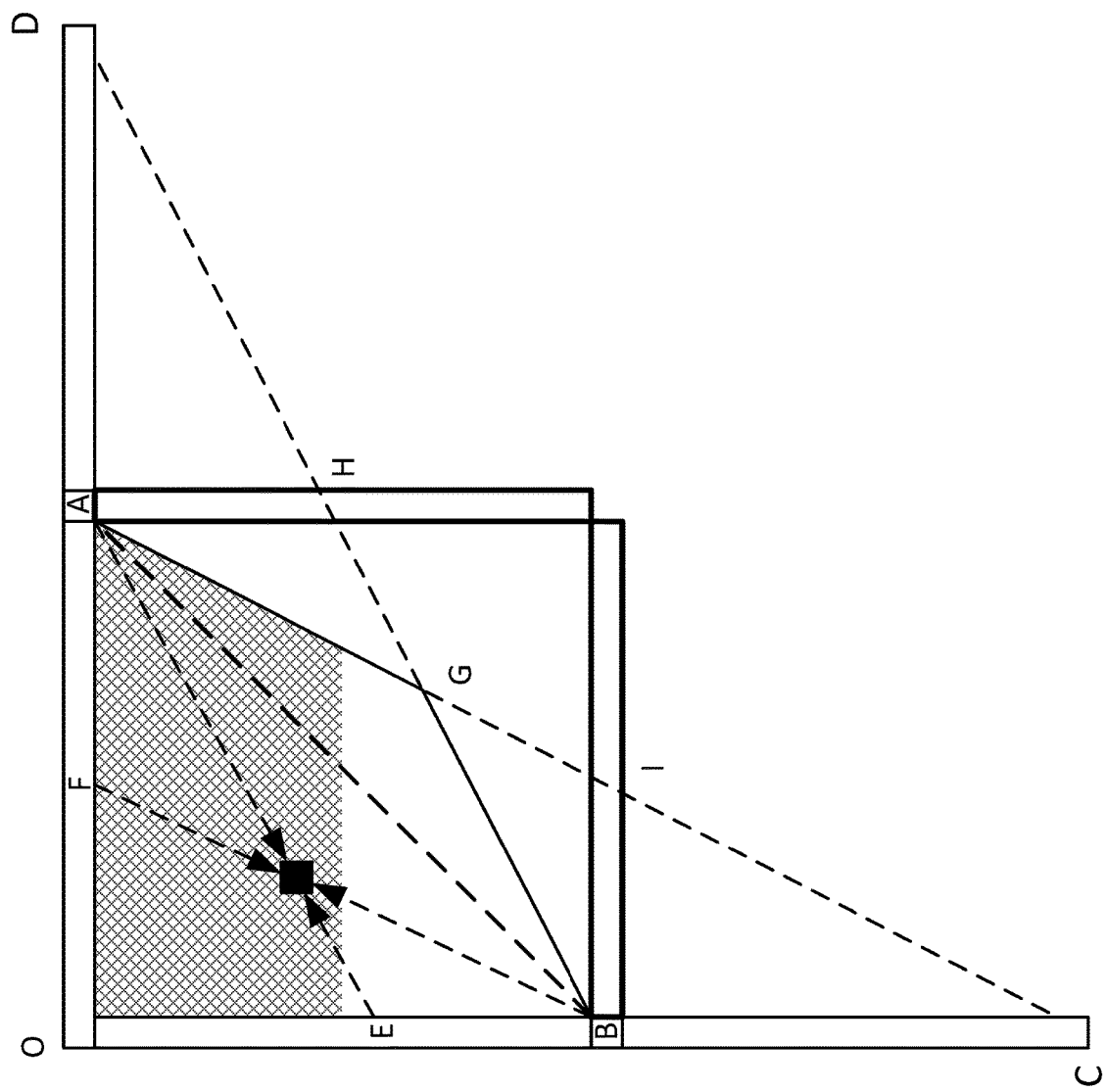
FIG. 10 illustrates an example intra planar approach to predict a top region (hatched region).

FIG. 10 illustrates an example of intra planar approach to predict a top region (e.g., hatched region). The intra planar approach described herein to predict the top hatched region shown in FIG. 10 may be referred to as Approach-2. Prediction of the top hatched region shown in FIG. 10 may be divided into one or more (e.g., two) parts: the top-left triangular region OAB and the triangular region ABG. In example, pixels in the top-left triangular region OAB, illustrated in FIG. 10, may be predicted, for example, using Approach-1 described herein. Pixels in the triangular region ABG may be predicted, for example, using an extended approach of Approach-1.

The extended approach of Approach-1 may allow intercepts located between the reconstructed top reference line and the extension of the reconstructed top reference line. For example, a pixel X' (not shown in FIG. 10) in the triangular region ABG may be predicted by using one or more pivot reference pixels and one or more intercept reference pixels. The pivot reference pixels may be the top-right and bottom-left reference pixels (e.g., pixels 'A' and 'IT, respectively). Given location of pixels X' and 'A,' a straight line may be drawn through pixels X' and 'A' to find an intercept reference pixel E' (not shown in FIG. 10) on the reconstructed left reference line. The intercept reference pixel E' may be located within the reconstructed left reference line and the extension of the reconstructed left reference line (e.g., segment OC shown in FIG. 10). In examples, the pixel value at the intercept reference pixel E' may be determined by weighted average of adjacent pixels. In examples, the pixel value at the intercept reference pixel E' may be determined by linear interpolation. Pixel value at X' may be estimated by weighted average of pixels 'A' and E'. For example, pixel value at X' may be estimated by linear interpolation. The weighted average value of pixels 'A' and E' may be $X'_1$. A straight line may be drawn through 'B' and X' (not shown in FIG. 10) to find an intercept reference pixel F' (not shown in FIG. 10) with the reconstructed top reference line. The intercept reference pixel F' may be located within reconstructed top reference line and the extension of the reconstructed top reference line (e.g., segment OD shown in FIG. 10). In examples, the pixel value at the intercept reference pixel F' may be determined by weighted average of adjacent pixels. In examples, the pixel value at the intercept reference pixel F' may be determined by linear interpolation. Pixel value at X' may be estimated by weighted average of pixels 'B' and F'. For example, pixel value at X' may be estimated by linear interpolation. The weighted average value of pixels 'B' and F' may be $X'_2$. The pixel value at X' may be computed based on an average of $X'_1$ and $X'_2$.

The remaining pixels in the current block, indicated by the unhatched region in FIG. 10, may be predicted. For example, the remaining pixels in the unhatched region of the current block may be predicted using Approach-0 described herein. The intra planar predictions may predict pixels for the triangular regions AGH and BGI. For example, the intra planar predictions may predict pixels for the triangular regions AGH and BGI using $P_{x,y}^V$ in Equation (1) and $P_{x,y}^H$ in Equation (2). The intra planar prediction may average $P_{x,y}^V$ and $P_{x,y}^H$, for example, using Equation (3). In triangular region AGH shown in FIG. 10, the horizontal prediction portion may be predicted using Approach-2 described herein. For example, the horizontal prediction portion of AGH may be predicted as a line starting from a pivot reference pixel 'B' is intercepted with an intersect located within the segment AD. The segment AD may be the extension of the reconstructed top reference line. The vertical prediction portion of AGH may be predicted, for example, using Approach-0 described herein. Pixels in the triangular region AGH may be predicted, for example, by averaging the horizontal prediction portion and the vertical prediction portion using Equation 3.

Prediction by combining a horizontal prediction using Approach-0 and/or Approach-2 as described herein, with a vertical prediction using Approach-0 and/or Approach-2 may be referred to as a hybrid approach or Approach-2A.

Pixels in the triangular region BGI, shown in FIG. 10, may be predicted using the hybrid approach or Approach-2A described herein. For example, the vertical prediction portion may be predicted, for example, using Approach-2. The horizontal prediction portion may be predicted, for example, using Approach-0. The pixels in the triangular region BGI may be predicted, for example, using Approach-2A to combine the horizontal prediction by Approach-0 and the vertical prediction by Approach-2.

The pixels in the remaining regions located on the unhatched region shown in FIG. 10 (the remaining unhatched region that is not covered by triangular region AGH or BGI) may be predicted (e.g., interpolated) using Approach-0.

One or more pixels in the current block may be predicted based on predicted pixels on a non-reconstructed right and/or bottom reference line(s). For example, an interpolation approach may use one or more (e.g., all) of the following equations.

$$P_{x,y}^V = (N-y) \cdot R_{x,0} + y \cdot R_{x,N+1} \quad (10)$$

$$P_{x,y}^H = (N-x) \cdot R_{0,y} + x \cdot R_{N+1,y} \quad (11)$$

$$P_{x,y} = (P_{x,y}^V + P_{x,y}^H + N) >> (\log_2(N)+1). \quad (12)$$

Equations (10)~(12) may use the non-reconstructed right and/or bottom reference line(s) (e.g., $R_{x,N+1}$ and/or $R_{N+1,y}$) in the interpolation process to predict one or more pixels in a current block.

Figure 11B:
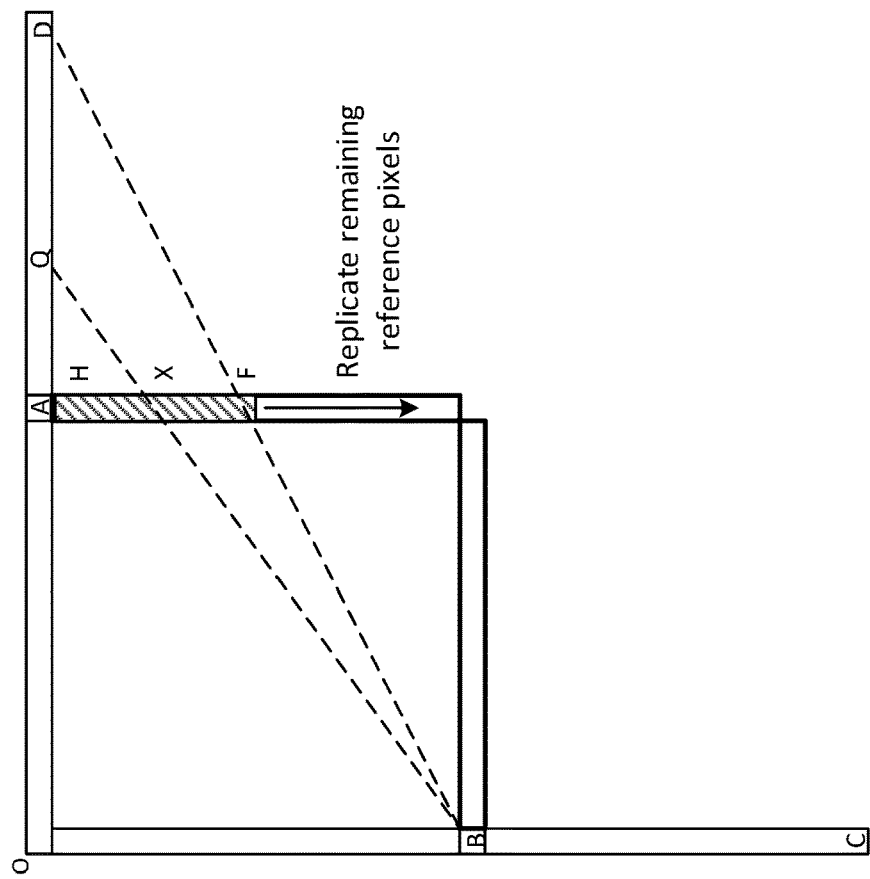
FIG. 11B illustrates an example intra planar approach to predict part of the non-reconstructed right reference line by interpolating between reference pixel 'B' and reference pixels along the reference segment AD.
Figure 11A:
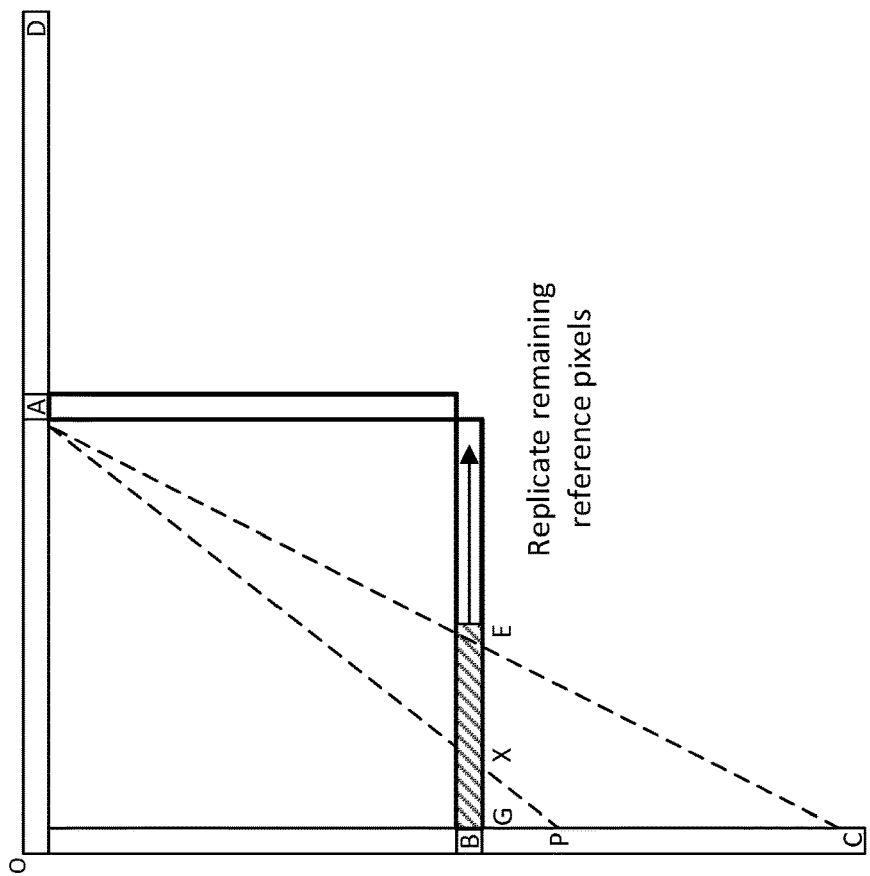
FIG. 11A illustrates an example intra planar approach to predict part of the non-reconstructed bottom reference line by interpolating between reference pixel 'A' and reference pixels along the reference segment BC.

FIGS. 11A and 11B illustrate examples for predicting pixels of segments along the non-reconstructed bottom reference line and the non-reconstructed right reference line. For example, pixel 'E' in FIG. 11A may be the pixel at the intercept of a straight line joining reference pixels 'A' (e.g., $R_{N+1,0}$) and 'C' (e.g., $R_{0,2N}$) and the non-reconstructed bottom reference line to be predicted. Pixel 'X' may be a pixel position, for example, in segment GE. The segment GE may be a part of the non-reconstructed bottom reference line to be predicted. Pixels along segment GE may be predicted based on a pivot reference pixel 'A' located on the reconstructed top reference line and an intercept reference pixel 'P' located on an extension of the reconstructed left reference line. A straight line between pixels 'A' and 'X' may be drawn to intercept with the intercept reference pixel 'P' located on the extension of the reconstructed left reference line. The intercept reference pixel 'P' may be the intercept of a straight line passing through pixels 'A' and 'X' and the extension of the reconstructed left reference line. Pixel value at 'P' may be determined by weighted averaging of adjacent pixels. For example, pixel value at 'P' may be determined by linear interpolation. Pixel value at 'X' may be computed by weighted averaging pixels at 'A' and 'P.' In examples, pixel value at 'X' may be computed by weighted averaging pixels at 'A' and 'P' using linear interpolation. In examples, pixel value at 'X' may be computed by weighted averaging pixels at 'A' and 'P' using the Euclidean distance from pixel 'X'. Once pixels in segment GE are predicted (e.g., interpolated), the remaining pixels in the non-reconstructed bottom reference line may be obtained by replicating the pixel 'E'.

FIG. 11B illustrates an example of interpolating the non-reconstructed right reference line. The intercept reference pixel 'F' may be the intercept of the straight line joining the reference pixels 'B' (e.g., $R_{0,N+1}$) and 'D' (e.g., $R_{2N,0}$) and the non-reconstructed right reference line. Pixel 'X' may be a pixel position, for example, in segment HF. The segment HF may be a part of the non-reconstructed right reference line. Pixels along segment HF may be predicted based on a pivot reference pixel 'B' located on the reconstructed left reference line and an intercept reference pixel 'Q' located on an extension of the reconstructed top reference line. A straight line between pixels 'B' and 'X' may be drawn to intercept with the intercept reference pixel 'Q' located on the extension of the reconstructed top reference line. Pixel 'Q' may be the intercept of the straight line passing through pixels 'B' and 'X' and the reconstructed top reference line. Pixel value at 'Q' may be determined by weighted average of adjacent pixels. For example, pixel value at 'Q' may be determined by linear interpolation. Pixel value at 'X' may be computed by weighted average pixels at 'B' and 'Q.' In examples, pixel value at 'X' may be computed by weighted average pixels at 'B' and 'Q' using linear interpolation. In examples, pixel value at 'X' may be computed by weighted average pixels at 'B' and 'Q' using the Euclidean distance from pixel 'X.' With the interpolated segment HF, the remaining pixels along the non-reconstructed right reference line may be obtained by replicating the pixel 'F'.

Figure 12B:
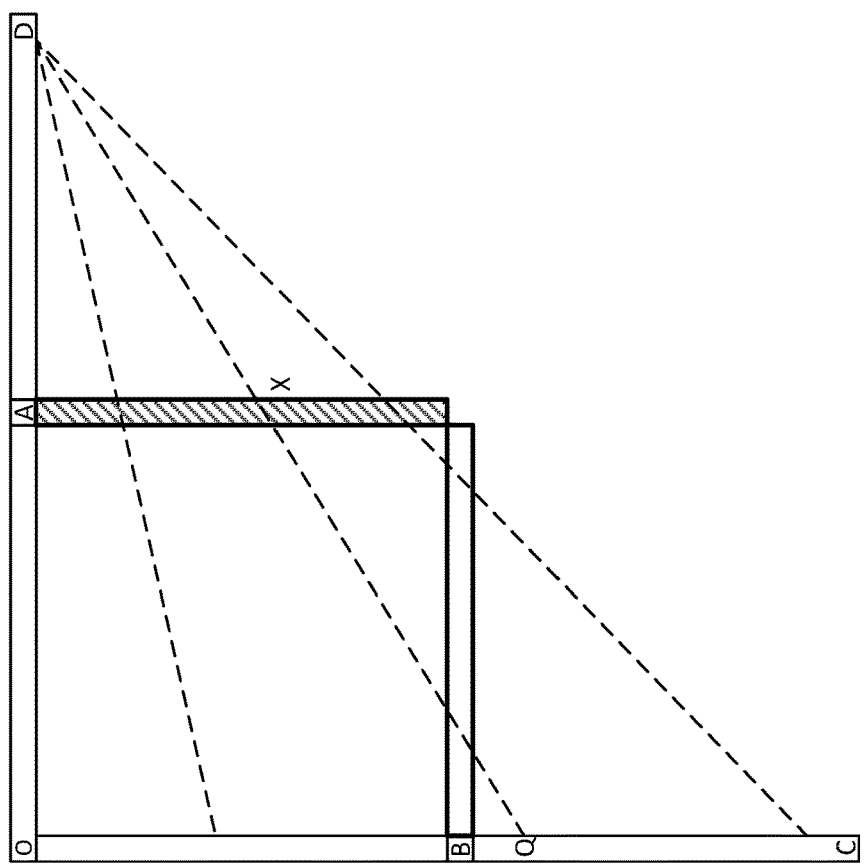
FIG. 12B illustrates an example of obtaining the non-reconstructed right reference line by interpolating between a pivot reference pixel 'D' and reference pixels along the segment OC.
Figure 12A:
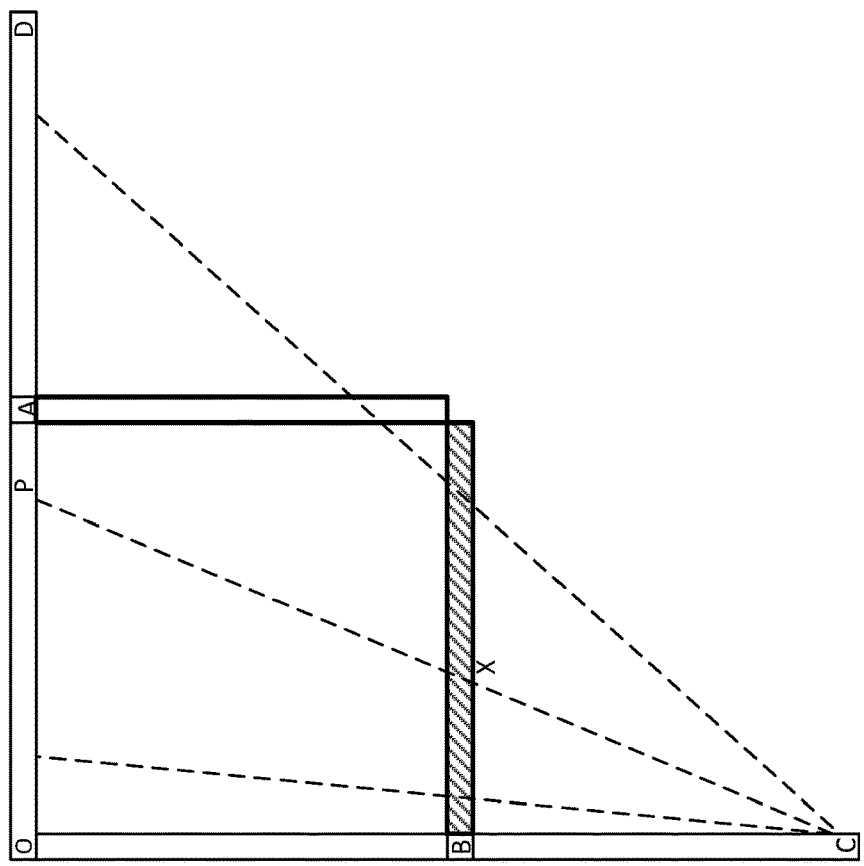
FIG. 12A illustrates an example of obtaining the non-reconstructed bottom reference line by interpolating between a pivot reference pixel 'C' and reference pixels along the segment OD.

FIGS. 12A and 12B illustrate examples of predicting an non-reconstructed right reference line and an non-reconstructed bottom reference line based on pixels on an extension of the reconstructed top reference line (e.g., segment AD) and an extension of the reconstructed left reference line (e.g., segment BC), respectively. Prediction approach of the non-reconstructed right and bottom reference lines described herein may be referred to as Approach-4. For example, one or more pixels on the non-reconstructed right and bottom reference lines may be predicted based on a pivot reference pixel on an extension of a reconstructed reference line and a corresponding intercept reference pixel on the other reconstructed reference line and the extension of the other reconstructed reference line.

One or more pixels on the non-reconstructed bottom reference line may be predicted based on a pivot reference pixel 'C' and an intercept reference pixel 'P' along the reconstructed top reference line and the extension of the reconstructed top reference line shown in FIG. 12A. A pivot reference pixel may be identified. For example, a pivot reference pixel may be identified as pixel 'C' positioned in $R_{0,2N}$ of the current block. The pivot reference pixel 'C' may be located on the extension of the reconstructed left reference line. A straight line may be projected from the pivot reference pixel 'C' passing through pixel 'X'. The straight line from the pivot reference pixel 'C' passing through pixel 'X' may intercept at an intercept reference pixel 'P' located on the reconstructed top reference line and the extension of the reconstructed top reference line. The pixel value at 'P' may be obtained by weighted average of adjacent pixels. For example, the pixel value at 'P' may be obtained by weighted average of adjacent pixels using the two nearest neighboring pixels at integer positions. The pixel value at 'X' may be predicted using a weighted average of pixels 'C' and 'P' based on the Euclidean distance from pixel 'X.'

One or more pixels on the non-reconstructed right reference line may be similarly predicted based on a pivot reference pixel 'D' (e.g., $R_{2N,0}$) and an intercept reference pixel 'Q' on the reconstructed left reference line and the extension of the reconstructed left reference line shown in FIG. 12B. The pivot reference pixel 'D' may be located on an extension of the reconstructed top reference line.

An non-reconstructed bottom reference line and an non-reconstructed right reference line may be predicted by combining one or more approaches described herein and may be referred to as Approach-5. For example, the non-reconstructed bottom and top reference lines may be divided into one or more parts.

Figure 13B:
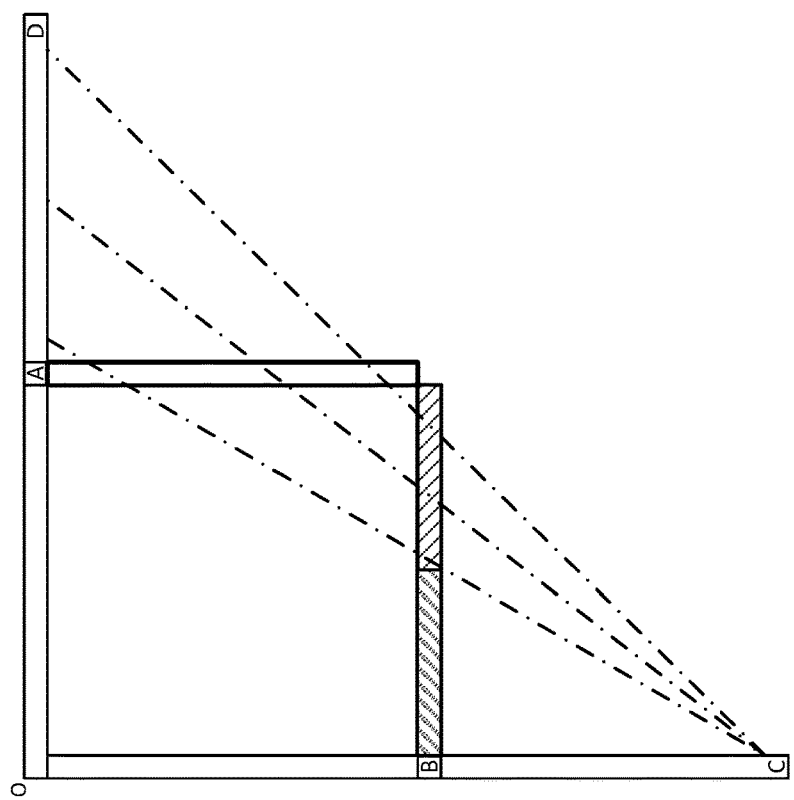
FIG. 13B illustrates an example of interpolating the remaining part of the non-reconstructed bottom reference line using example shown in FIG. 12A.
Figure 13A:
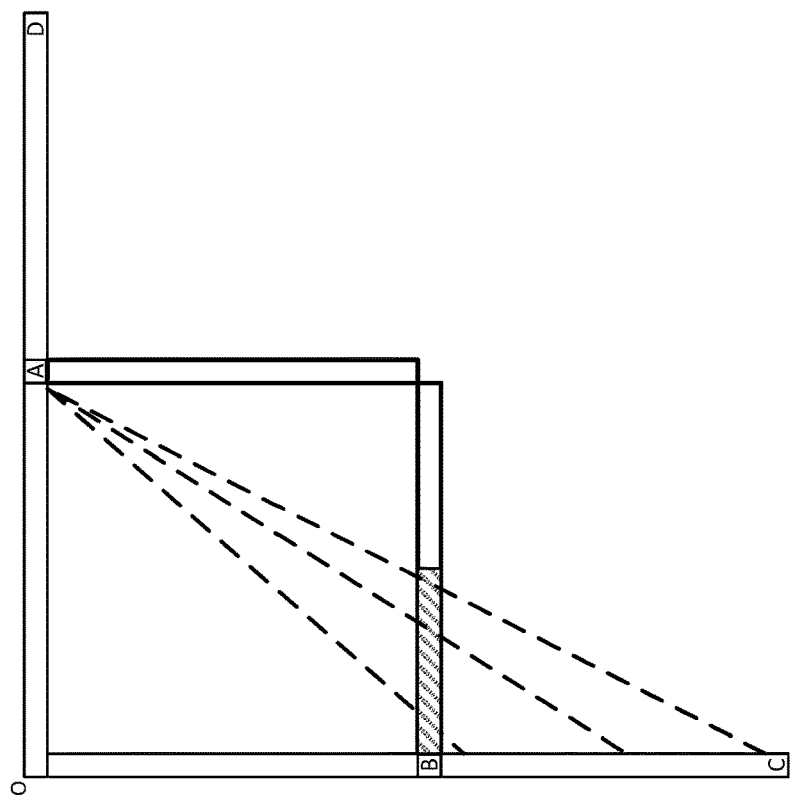
FIG. 13A illustrates an example of interpolating a part of the non-reconstructed bottom reference line using example shown in FIG. 11A.
Figure 13D:
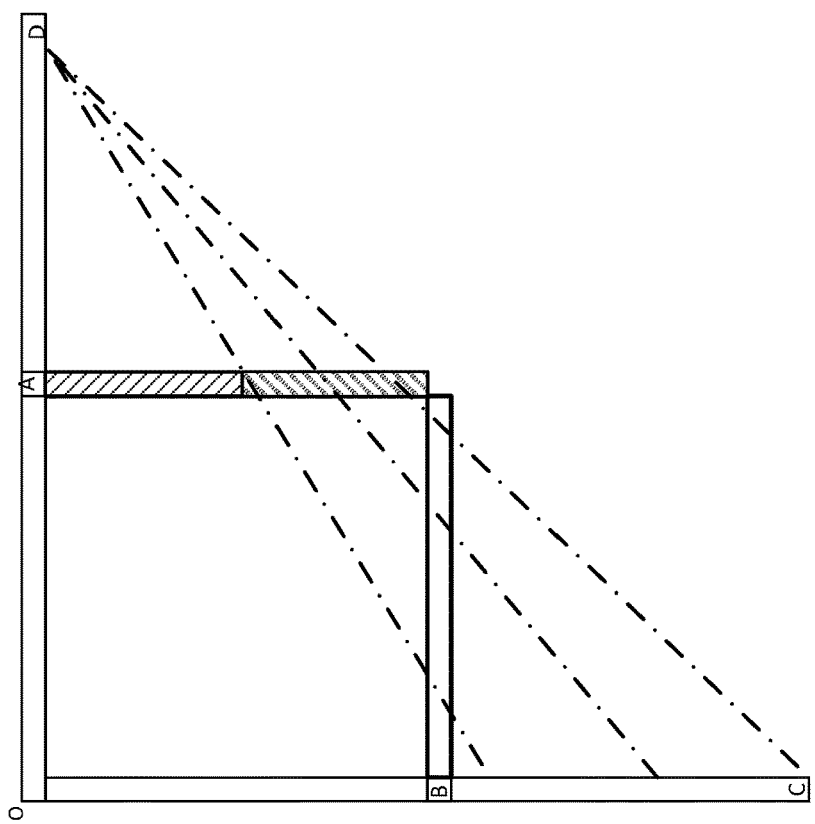
FIG. 13D illustrates an example of interpolating the remaining part of the non-reconstructed right reference line using example shown in FIG. 12B.
Figure 13C:
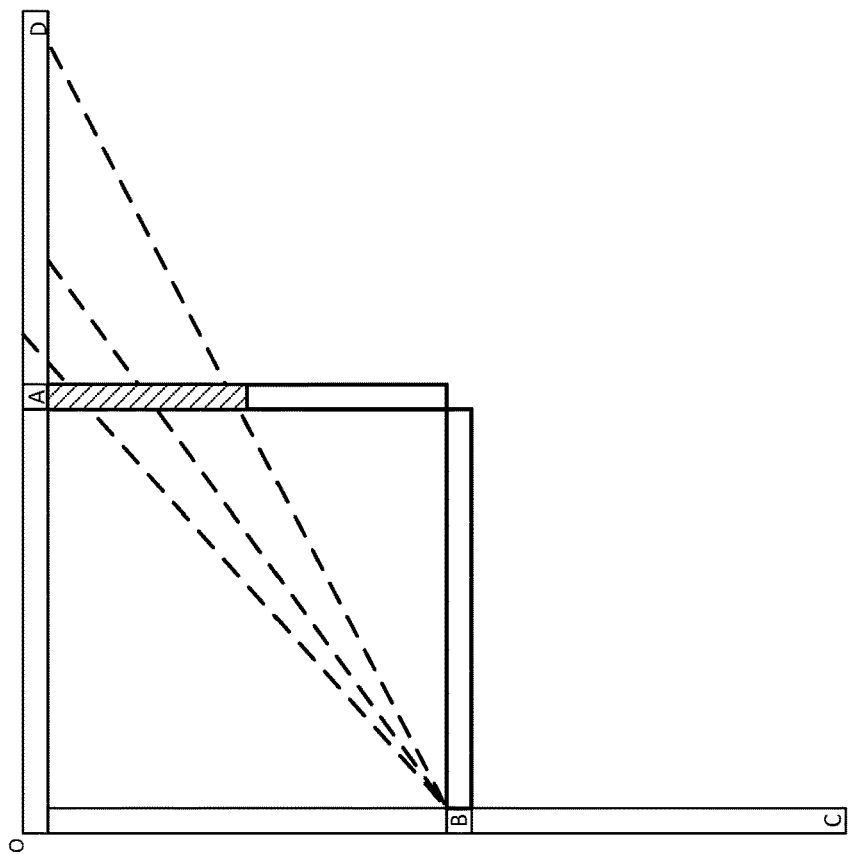
FIG. 13C illustrates an example of interpolating a part of the non-reconstructed right reference line using example shown in FIG. 11B.

FIGS. 13A and 13B illustrate examples of predicting an non-reconstructed bottom reference line by combining one or more approaches described herein (e.g., Approach-3 and Approach-4). FIGS. 13C and 13D illustrate examples of predicting an non-reconstructed right reference line by combining one or more approaches described herein (e.g., Approach-3 and Approach-4).

An non-reconstructed bottom reference line may be predicted in parts. For example, the non-reconstructed bottom reference line may be predicted in two parts: the first half and the remaining half of the bottom reference line shown in FIG. 13A and FIG. 13B, respectively. A selected part of the non-reconstructed bottom reference line (e.g., the first half of the non-reconstructed bottom reference line) may be predicted, for example, using Approach-3, as shown in FIG. 11A. The remaining part of the non-reconstructed bottom reference line (e.g., the remaining half of the non-reconstructed bottom reference line) may be predicted, for example, using Approach-4, as shown in FIG. 12A.

Similarly, an non-reconstructed right reference line may be predicted in parts. For example, the non-reconstructed right reference line may be predicted in two parts: the first half and the remaining half of the non-reconstructed right reference line shown in FIG. 13C and FIG. 13D, respectively. A selected part of the non-reconstructed right reference line (e.g., the first half of the non-reconstructed right reference line) may be predicted, for example, using Approach-3, as shown in FIG. 11B. The remaining part of the non-reconstructed right reference line (e.g., the remaining half of the non-reconstructed right reference line) may be predicted, for example, using Approach-4, as shown in FIG. 12B. The pixels in the current block may be predicted. For example, the pixels in the current block may be predicted using Approach-0 and/or combining with one or more (e.g., all) of the approaches described herein (e.g., Approach-1, Approach-2, Approach-3, Approach-4, and/or Approach-5).

Interpolation approaches described herein may be combined with one or more approaches to predict the non-reconstructed bottom and the non-reconstructed right reference lines.

Figure 14:
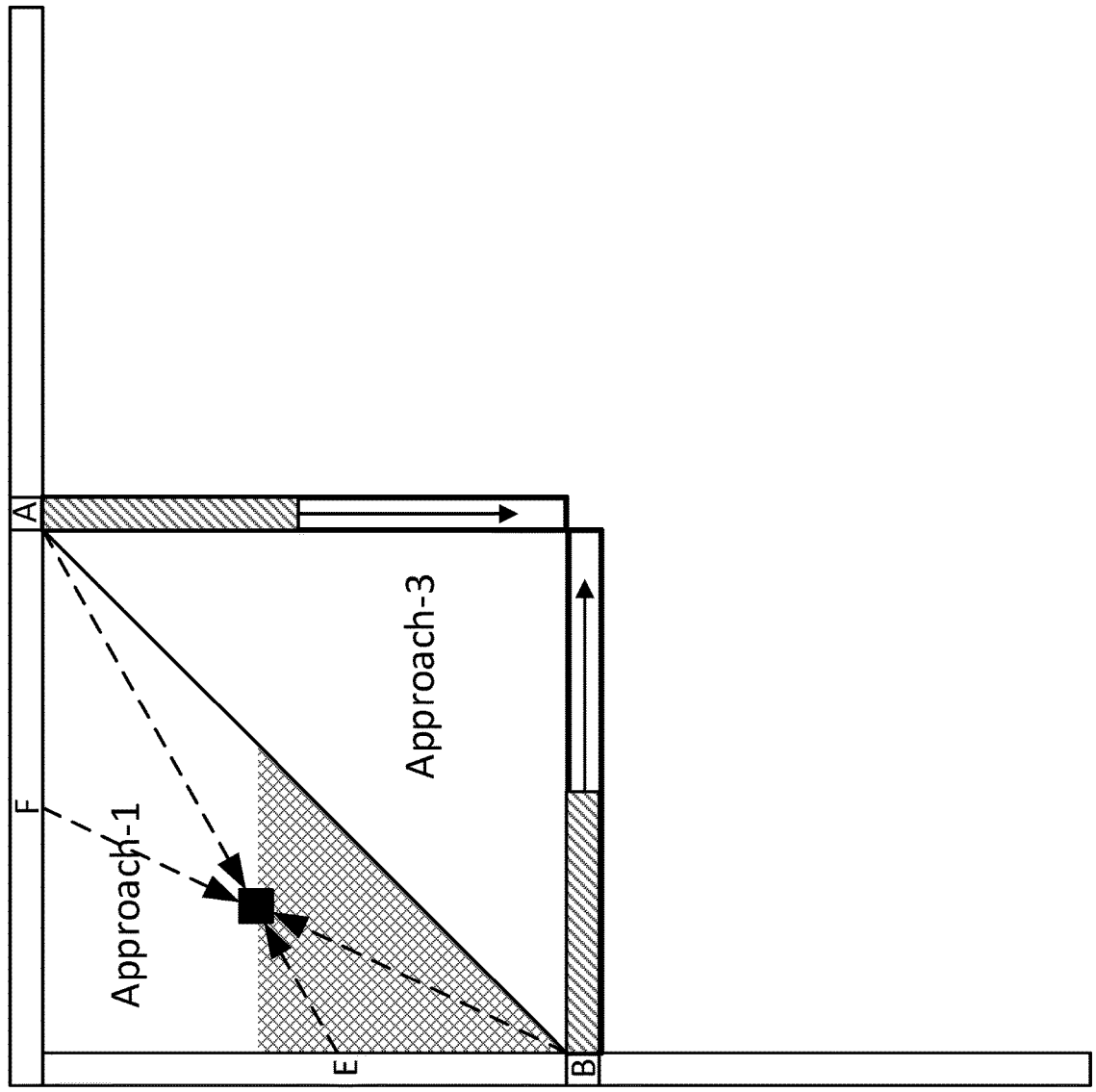
FIG. 14 illustrates an example combined approach to interpolate an non-reconstructed right reference line and an non-reconstructed bottom reference line. Pixels in the hatched region may be predicted using example shown in FIG. 9. Pixels in the remaining current block (e.g., unhatched region) may be predicted using examples shown in FIGS. 11A and 11B.

FIG. 14 illustrates example of combined approaches (e.g., Approach-1 and Approach-3) and may be referred to as Approach-6. A current block may be divided into an upper and a lower triangular regions, as shown in FIG. 14. The pixels in the upper triangular region may be predicted, for example, using Approach-1 described herein. The non-reconstructed bottom and the non-reconstructed right reference lines may be predicted, for example, using Approach-3 described herein. The predicted bottom and the right reference lines may be used for predicting one or more pixels in the lower triangular region. The lower triangular region may be predicted, for example, by approaches based on one or more (e.g., all) of Equations (10)~(12).

Figure 15:
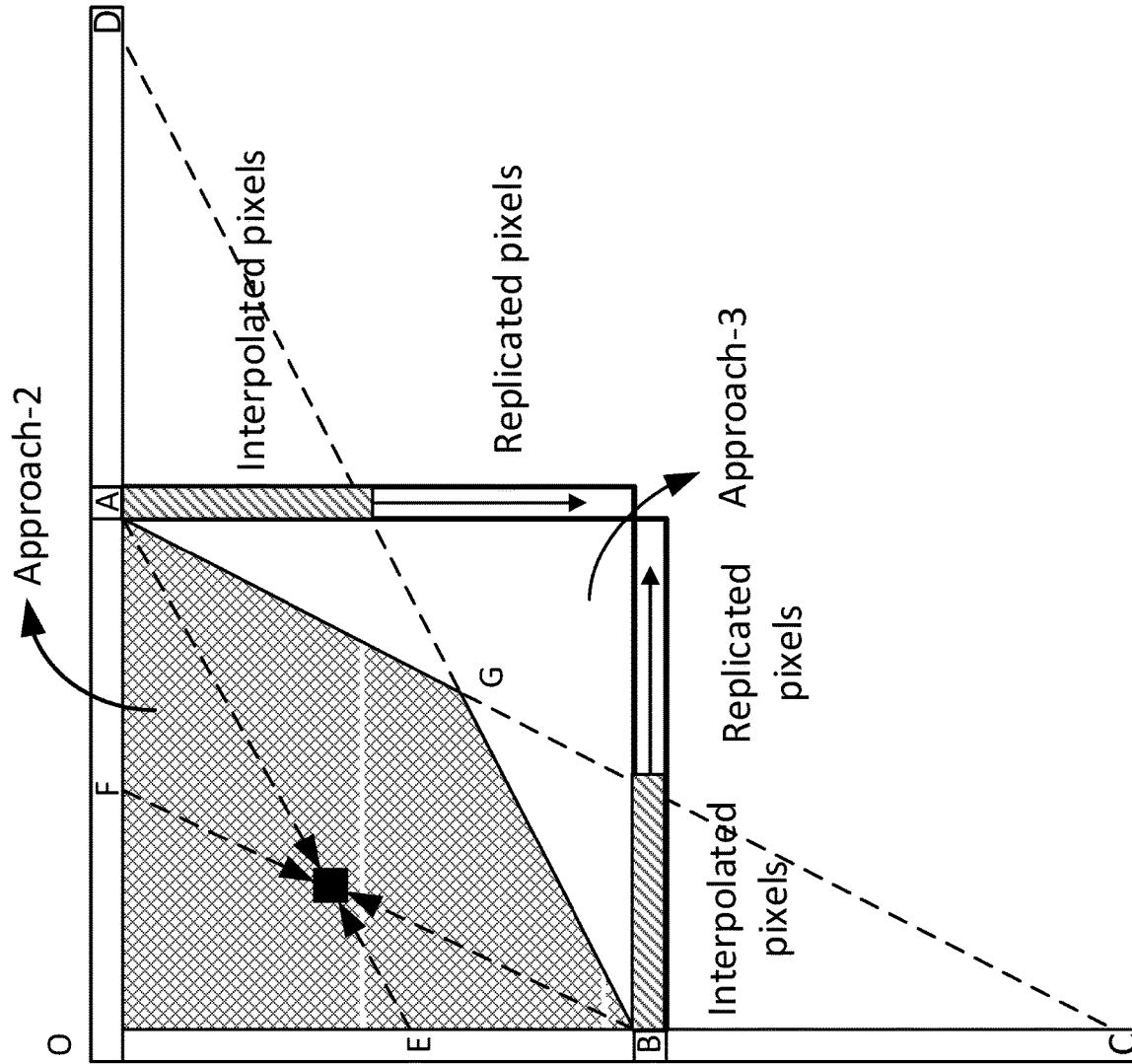
FIG. 15 illustrates an example combined approach to interpolate an non-reconstructed right reference line and an non-reconstructed bottom reference line. Pixels in the hatched region may be predicted using example shown in FIG. 10. Pixels in the remaining current block (e.g., unhatched region) may be predicted using examples shown in FIGS. 11A and 11B.

FIG. 15. illustrates example of combined approaches (e.g., Approach-2 and Approach-3) and may be referred to as Approach-7. A current block may be divided into an upper and a lower regions (e.g., hatched region or upper region and unhatched region or lower region), as shown in FIG. 15. The pixels in the upper region may be predicted using Approach-2 described herein. The pixels in the remaining lower region may be predicted. In examples, the pixels in the remaining lower region may be predicted, using Approach-3 described herein. In examples, the pixels in the remaining lower region may be predicted using a combination of Approach-2A and Approach-3 described herein.

Figure 16:
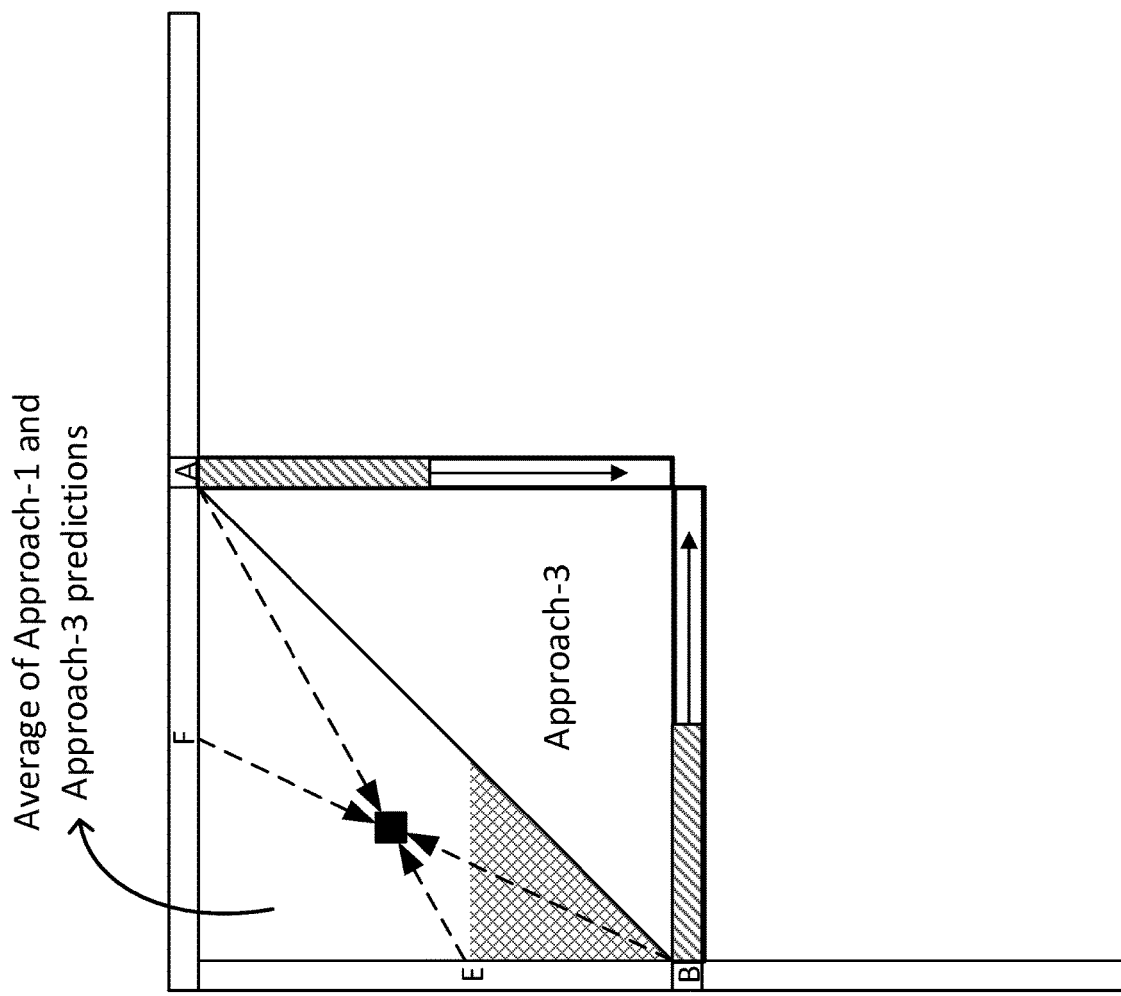
FIG. 16 illustrates an example combined approach to interpolate an non-reconstructed right reference line and an non-reconstructed bottom reference line. Pixels in the upper triangular region may be obtained by averaging the prediction samples from examples shown in FIG. 9 and FIGS. 11A and 11B. Pixels in the bottom triangular region may be predicted using example shown in FIGS. 11A and 11B.

FIG. 16 illustrates example of combined approaches (e.g., Approach-1 and Approach-3) and may be referred to as Approach-8. For example, a current block may be divided into an upper and a lower triangular regions, as shown in FIG. 16. The pixels in the upper triangular region may be predicted, for example, using Approach-1 described herein. The pixels in the upper triangular region may be predicted, for example, using Approach-3 described herein. The two sets of prediction pixels (e.g., samples) gathered from Approach-1 and Approach-3 may be averaged. The averaged pixel value may be the final pixel in the upper triangular region. The pixels in the lower triangular region may be predicted, for example, using Approach-3 described herein.

A decoder may detect and use one or more planar mode approaches described herein (e.g., Approach-0~Approach-8) that have been used to encode the video contents. In examples, the decoder may detect one or more planar mode approaches from an encoder. For example, an encoder may indicate information about use of the planar mode approaches by signaling the information in a bitstream. The encoder may explicitly signal the indication. In examples, the decoder may derive information about the use of the planar mode approaches. For example, the decoder may derive the use of the planar mode approaches information based on neighboring reconstructed samples. Deriving information regarding the use of the planar mode approaches may be performed at the encoder and/or the decoder.

An indicator may be signaled at CU and/or PU level in the bitstream. For example, a flag may be signaled in a bitstream. The signal in the bitstream may have a value (e.g., 0 or 1) to indicate the intra planar approaches. The value may be based upon the information that the use of one or more available approaches described herein (e.g., Approach-0~Approach-8). For example, the signal in the bitstream may have a value '1,' when one or more intra planar approaches described herein (e.g., Approach-1~Approach-8) are being used. The signal in the bitstream may have a value '0,' when Approach-0 is being used. An example of pseudocode for signaling may be described herein:

```
if(selected_mode == planar_mode)
{
    if(selected_mode == planar_approach)
        Encode one in the bitstream
    else
        Encode zero in the bitstream
}
```

A direct mode for chroma intra coding may impose a rule on the planar mode approaches. For example, the rule may restrict the use of the planar mode approaches for chroma based on whether luma selects the planar mode approaches.

A quad tree binary tree (QTBT) structure may use independent partitioning trees for luma and chroma PUs during intra coding. In examples, the chroma and luma PUs may not have the same partition structure. In examples, the chroma and luma PUs may use the same partition structure. When using the direct mode for a chroma PU in the QTBT framework, the position of the top-left 2×2 unit of the chroma PU may be considered. The intra mode of the associated luma may use 4×4 unit for predicting the chroma PU. When using the direct mode for a chroma PU in the QTBT framework, similar rules may be applied for predicting chroma from the associated luma using the planar mode approaches.

65 intra angular modes, as illustrated in FIG. 8, and the DC and planar modes may be used. One or more intra angular mode may be substituted with the planar mode approaches.

Different training videos may be encoded offline using an encoder. Average frequency of occurrence of an intra angular mode may be determined. The least frequently used intra angular mode may be substituted by the planar mode approaches. In intra coding, a most probable mode (MPM) list may be created to include the most frequently used intra modes. Signaling the associated index in the MPM list may be utilized by the intra mode. For example, more frequently occurring intra modes may be placed closer to the start of the MPM list. The MPM list may be modified to include the intra planar mode approaches as a part of the list. In examples, the planar mode approaches (e.g., Approach-1~Approach-8) may be the first entry in the MPM list. In examples, the planar mode approaches may be positioned after the planar mode Approach-0 in the MPM list.

An encoder may skip the signaling that may indicate the planar mode approach(es) being used. An encoder and/or a decoder may derive if one or more planar mode approaches are being used among available approaches. For example, during the intra mode selection, the encoder may test for one or more (e.g., all) intra mode approaches. For the planar mode selection, the encoder may use derivation approach to choose between one or more planar approaches described herein (e.g., Approach-1~Approach-8) and Approach-0 for predicting the block (e.g., current block). If the planar mode yields the least rate distortion (RD) cost over one or more (e.g., all) other intra modes, the encoder may signal the planar mode index. For example, the encoder may signal the planar mode index (e.g., as defined in a HEVC standard). The decoder receiving the planar mode index may perform derivation in the similar way as the encoder as described herein. The decoder may choose between one or more available planar approaches described herein (e.g., Approach-1~Approach-8) and Approach-0 for predicting the current block.

Figure 17:
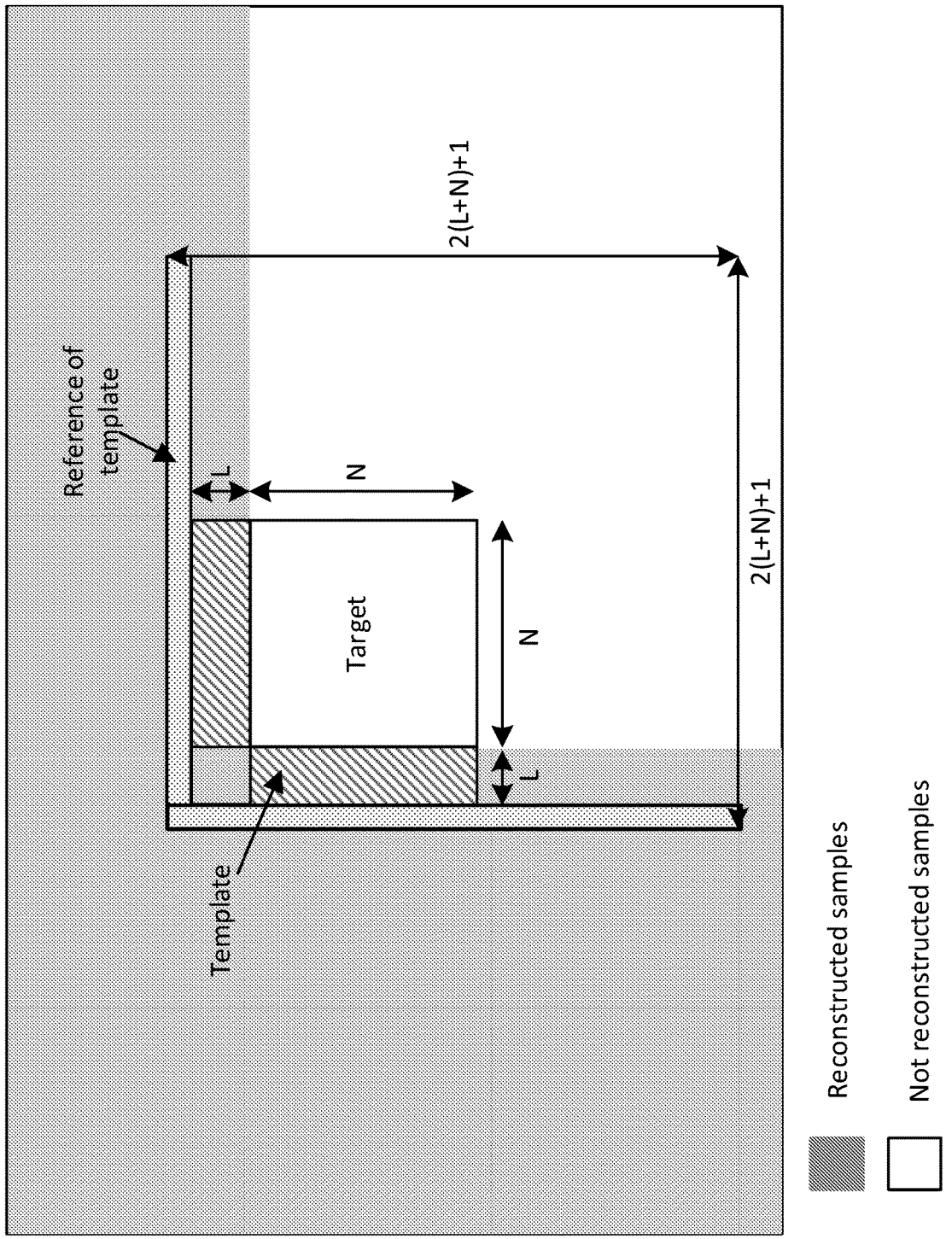
FIG. 17 illustrates examples of target pixels, template pixels and the reference pixels of template used in the decoder-side intra mode derivation (DIMD).

FIG. 17 illustrates example of the derivation process to determine information about use of the planar mode approaches. The target in FIG. 17 may represent, for example, a N×N CU to be encoded using a planar mode. The template may be a region on the top and left of a current block, including reconstructed reference pixels (e.g., having N×L and L×N sizes). In examples, the template size 'L' may be based on the current block size. For example, for 4×4 and 8×8 blocks, a template size may be L=2. For 16×16 blocks and/or larger blocks, a template size may be L=4. In examples, the template size may be fixed and may be independent from the current block size. The reference of template (e.g., indicated by the dotted region in FIG. 17)

may refer to a set of neighboring pixels above and left of the template. The template pixels may be from the reconstructed region. The reference pixels of the template may not be reconstructed when encoding and/or decoding the target block. The existing reference pixels substitution procedure may be utilized to substitute the unavailable reference pixels with the available reference pixels. For one or more (e.g., all) of the planar mode approaches, the derivation process may be used to calculate the sum of the absolute difference (SAD) between the reconstructed template pixels and the prediction pixels obtained from the reference pixels of the template. The planar mode that yields the minimum SAD may be selected as the planar mode to be used for prediction of the target block. Selecting the planar mode as described herein may be applied in the similar manner at the encoder and at the decoder.

The planar mode approaches described herein (e.g., Approach-1~Approach-8) may be modified when being applied to a template. For example, in Approach-3~Approach-8, pivot reference pixels may be repositioned when predicting the non-reconstructed bottom and the non-reconstructed right reference lines of a template.

Figure 18:
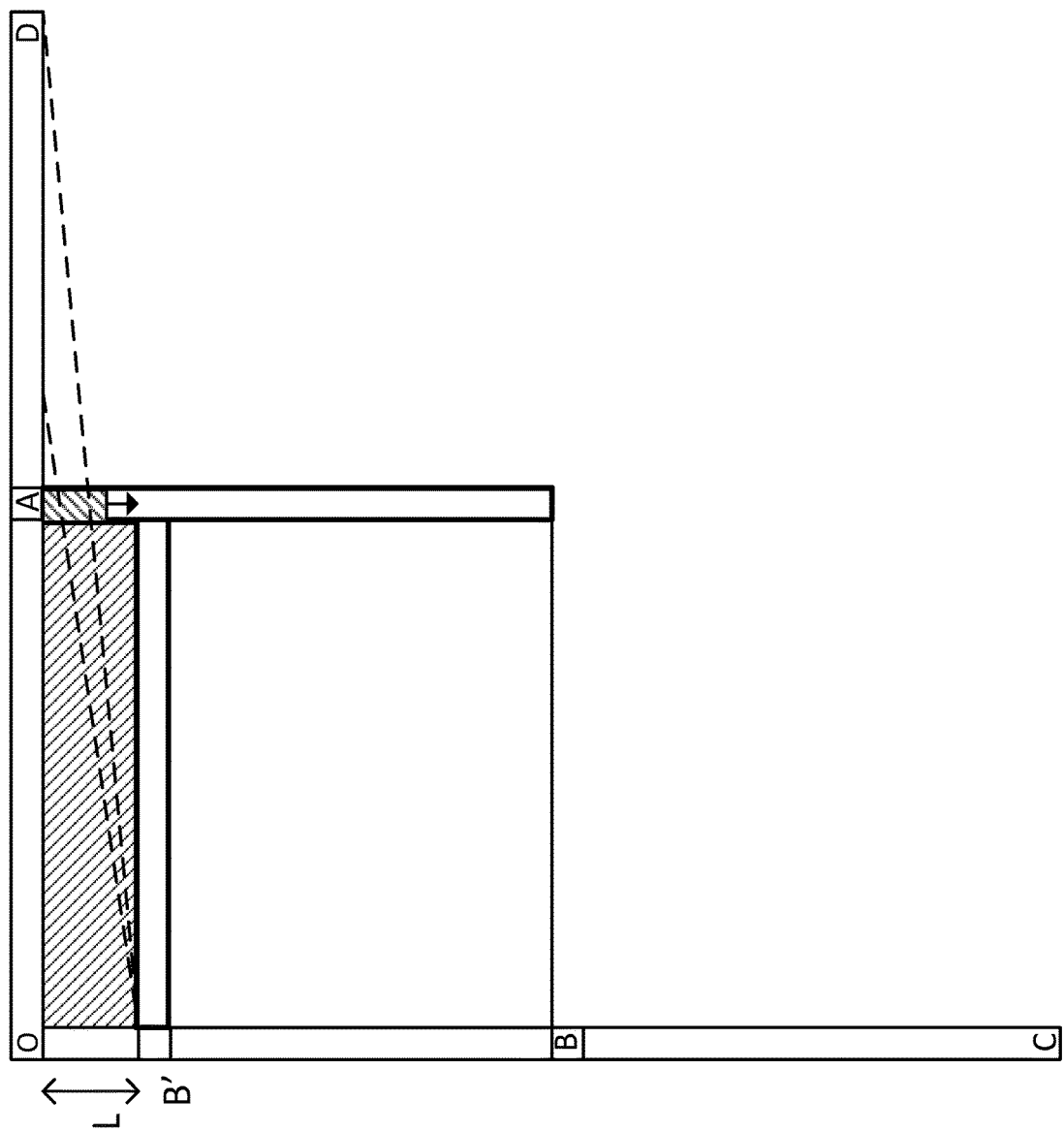
FIG. 18 illustrates an example of applying interpolation of using example shown in FIGS. 11A and 11B to a template above a target block (e.g., target PU).

FIG. 18 illustrates an example of applying Approach-3 described herein for the template above a target associated with current block. Modifications may be used for a template on the left of the current block. For example, when interpolating the non-reconstructed right reference line, the associated bottom-left pixel B' may be used as a pivot reference pixel, instead of pixel B. Similarly, pixel A may be used for predicting (e.g., interpolating) the non-reconstructed bottom reference line.

Figure 19:
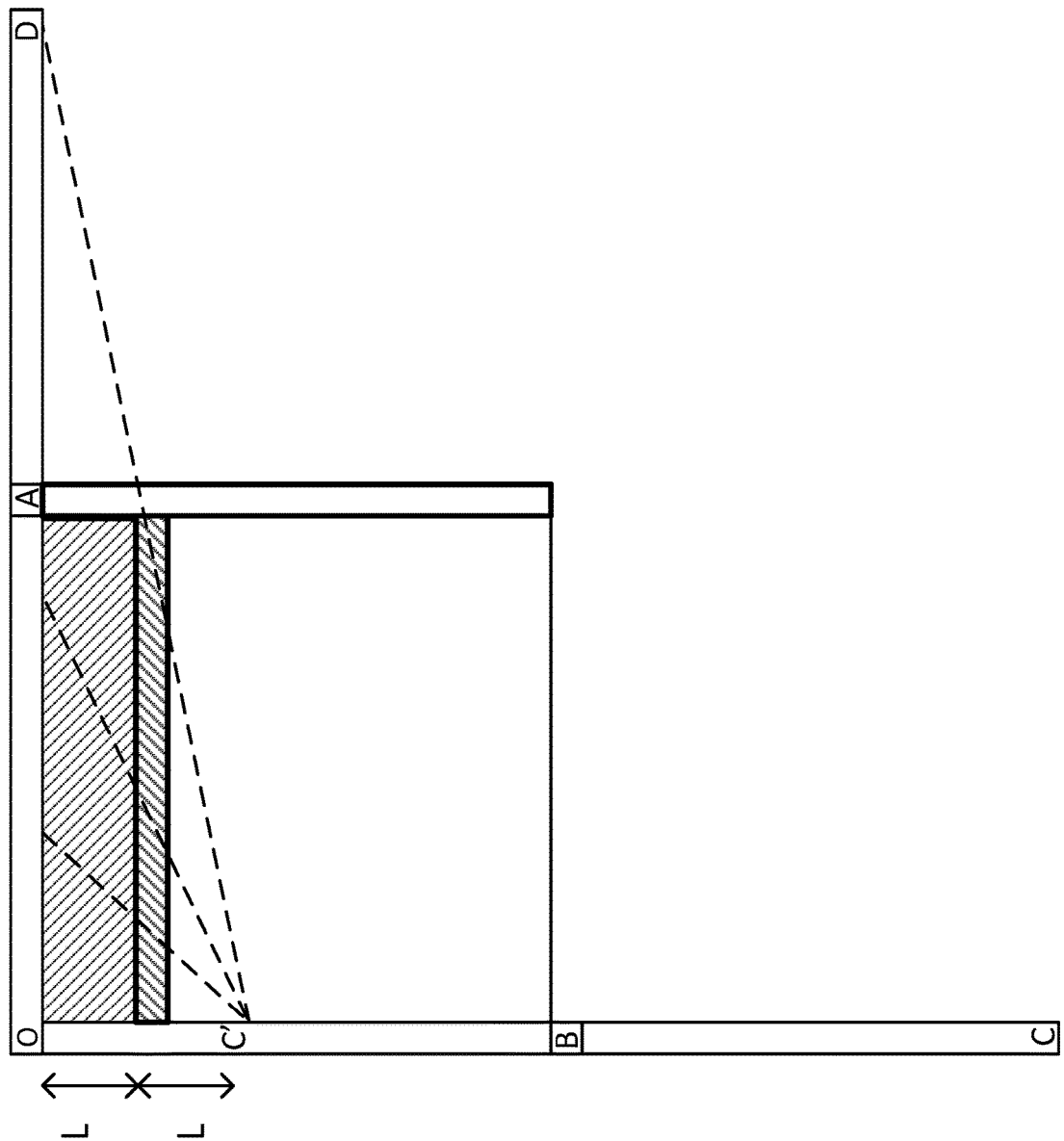
FIG. 19 illustrates an example of applying interpolation of using example shown in FIGS. 12A and 12B to a template above a target block (e.g., target PU).

FIG. 19 illustrates an example of applying Approach-4 for the template above a target associated with current block and/or similar template. The pivot reference pixel on the reconstructed left reference line may be positioned at twice the template height (e.g., 2*L) at pixel C.' Pixel C' may be used for predicting (e.g., interpolating) the non-reconstructed bottom reference line. Pivot reference pixel D may be used for interpolating the non-reconstructed right reference line.

Figure 20A:
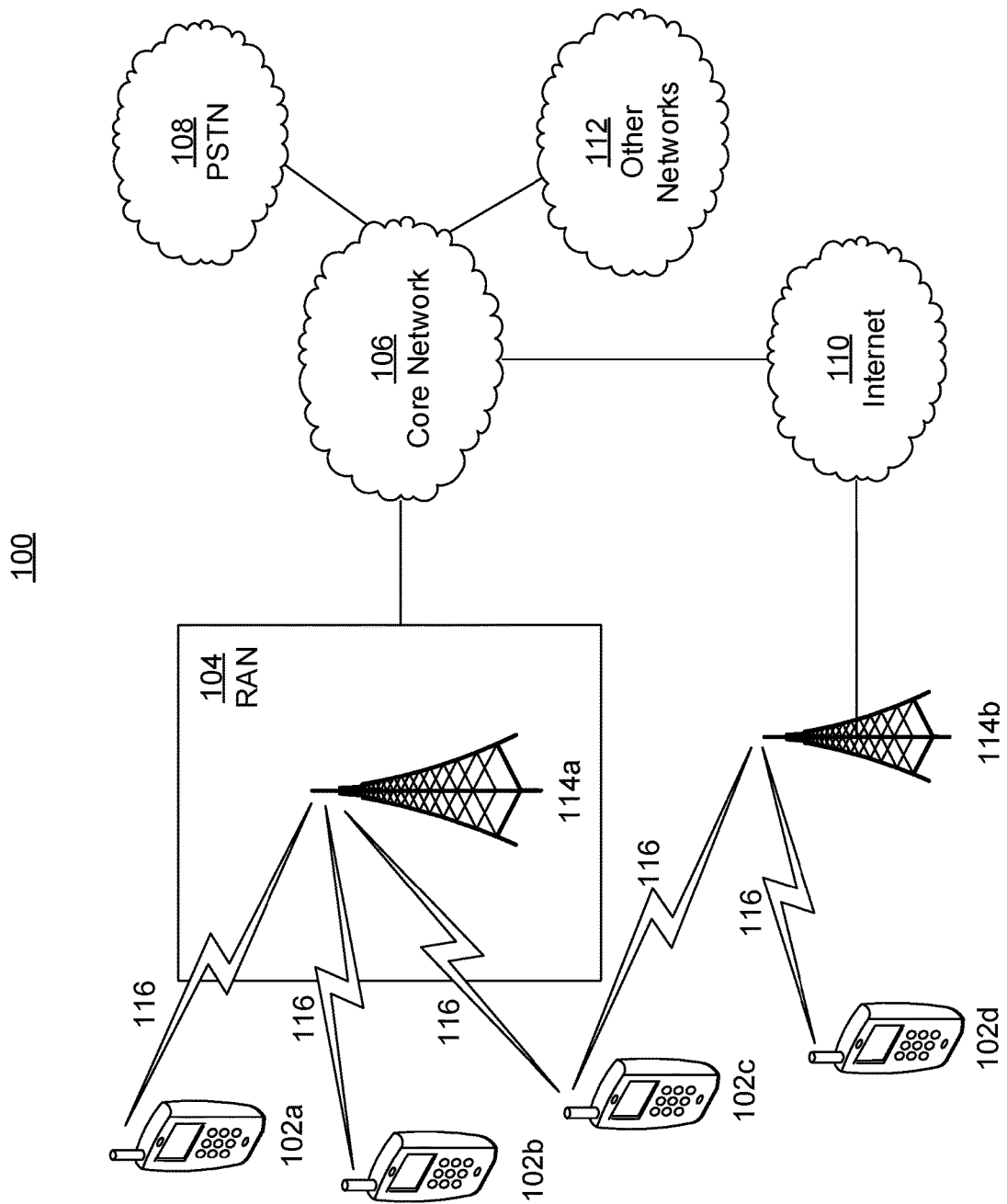
FIG. 20A is a system diagram illustrating an example communications system in which one or more disclosed embodiments may be implemented.

FIG. 20A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 20A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 20A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 20A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 20A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 20A may be configured to communicate with the base station 114a, which may employ a cellular-based radio technology, and with the base station 114b, which may employ an IEEE 802 radio technology.

Figure 20B:
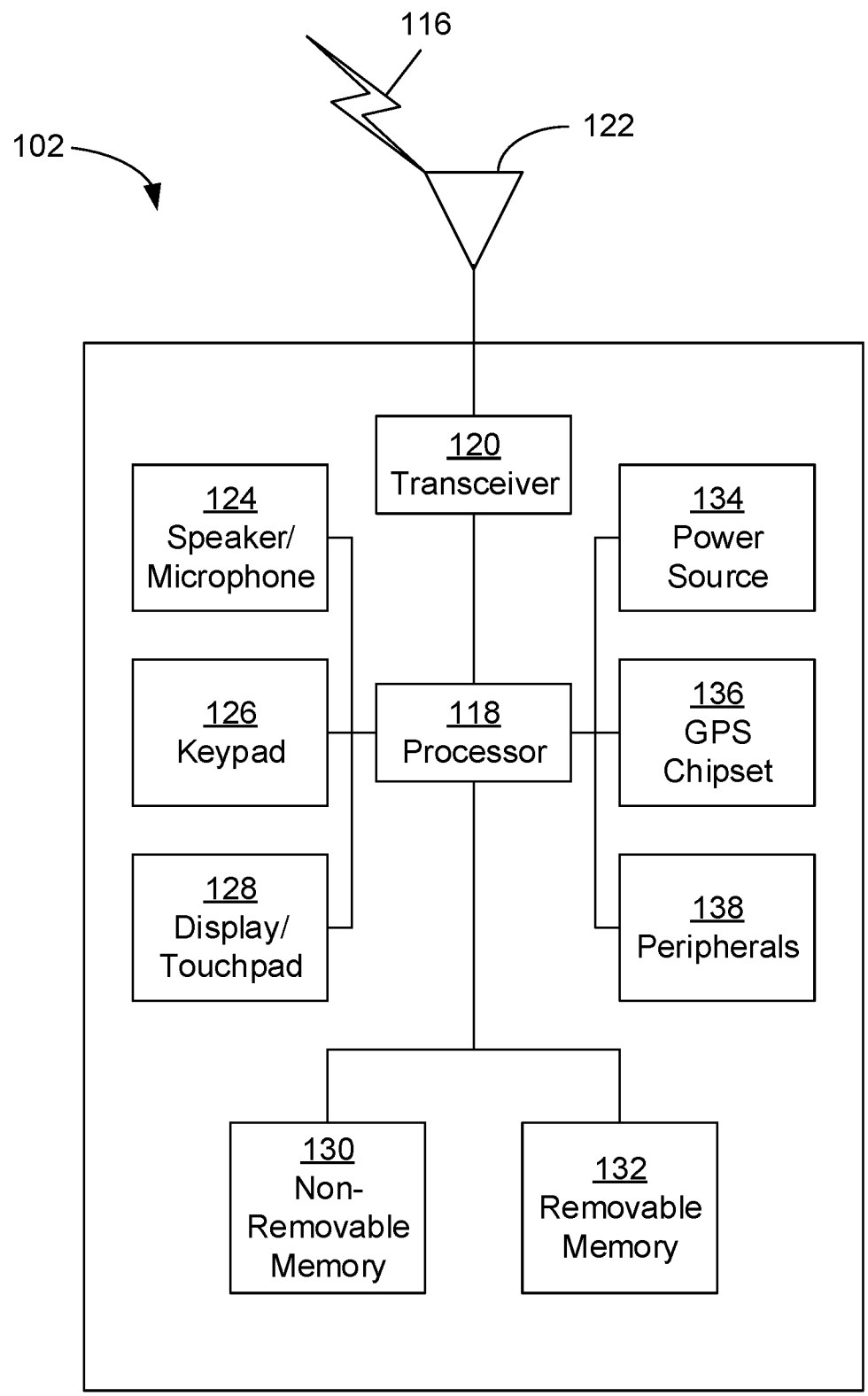
FIG. 20B is a system diagram illustrating an example wireless transmit/receive unit (WTRU) that may be used within the communications system illustrated in FIG. 20A according to an embodiment.

FIG. 20B is a system diagram illustrating an example WTRU 102. As shown in FIG. 20B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 20B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 20B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 20C:
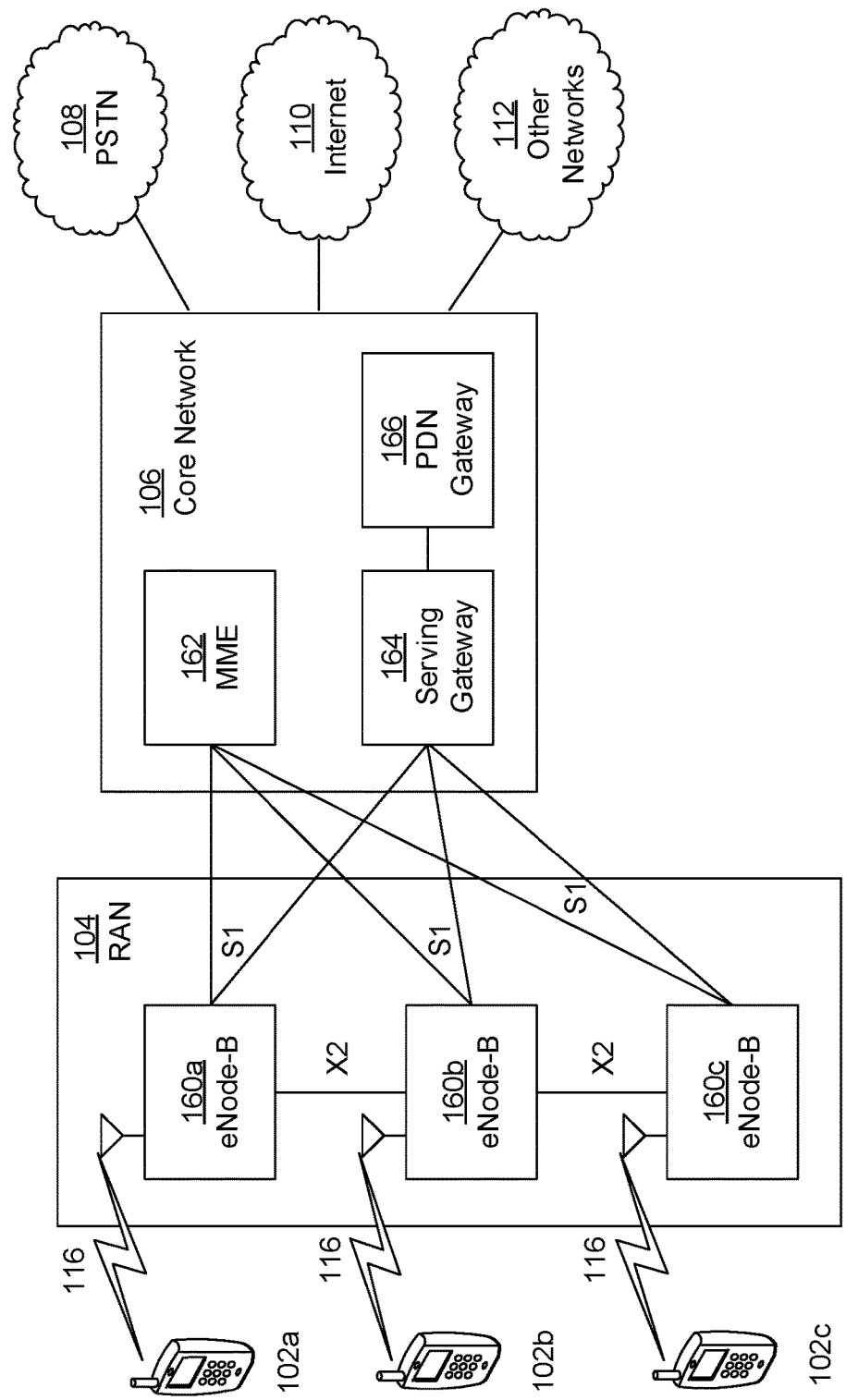
FIG. 20C is a system diagram illustrating an example radio access network (RAN) and an example core network (CN) that may be used within the communications system illustrated in FIG. 20A according to an embodiment.

FIG. 20C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 20C, the eNode-Bs 160a, 160b, 160c may communicate with one another over an X2 interface.

The CN 106 shown in FIG. 20C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 20A-20D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 20D:
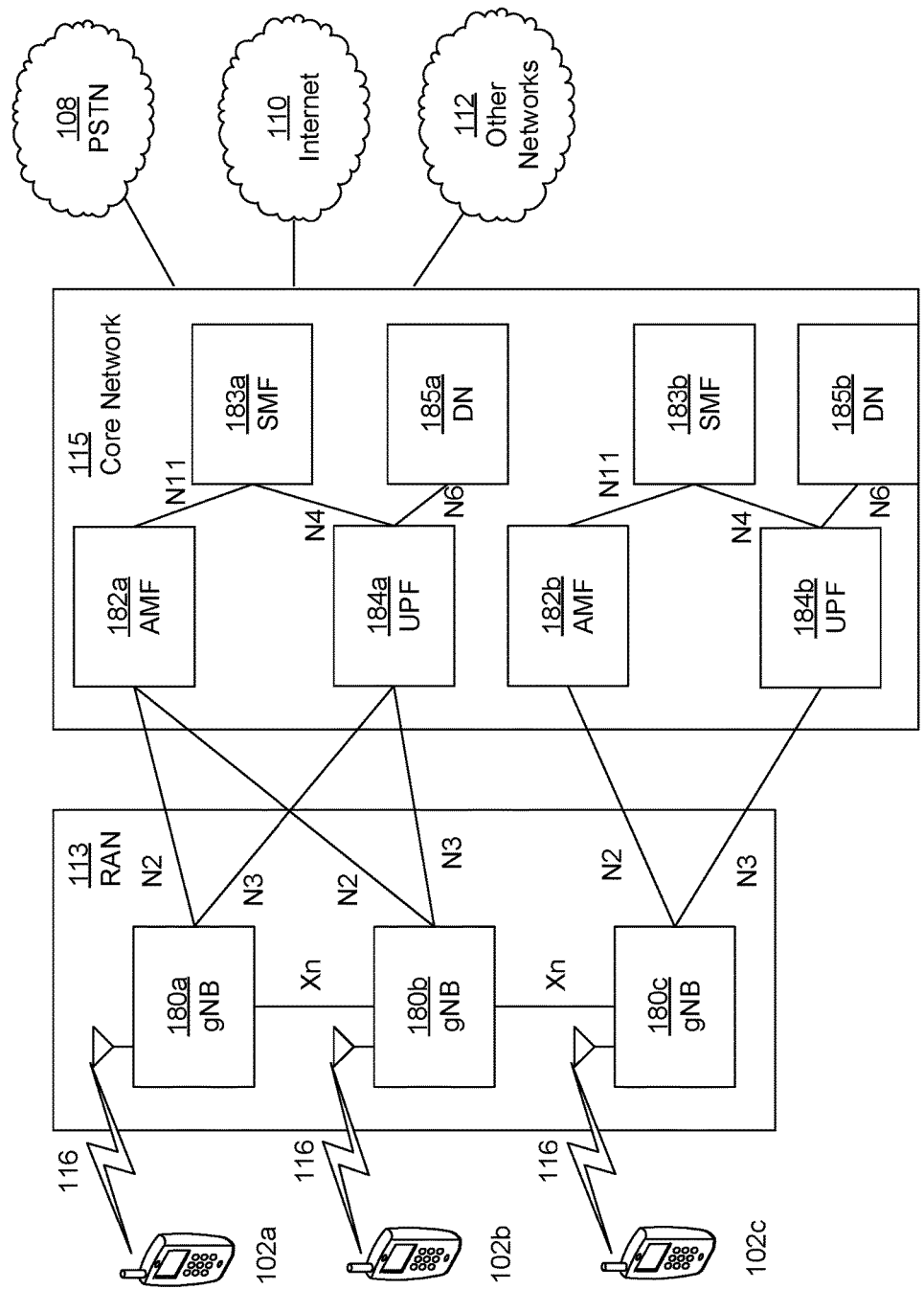
FIG. 20D is a system diagram illustrating a further example RAN and a further example CN that may be used within the communications system illustrated in FIG. 20A according to an embodiment.

FIG. 20D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 20D, the gNBs 180a, 180b, 180c may communicate with one another over an Xn interface.

The CN 115 shown in FIG. 20D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 20A-20D, and the corresponding description of FIGS. 20A-20D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

What is claimed:

1. A method of decoding comprising:
    obtaining a bitstream having a current block, the current block bordering a first reconstructed reference line, a second reconstructed reference line, and a third reference line to be predicted;
    identifying a pivot reference pixel located on an extension of the first reconstructed reference line bordering the current block, the extension comprising a plurality of reconstructed pixels that extend beyond the current block;
    predicting a plurality of pixels on the third reference line by interpolating based on a plurality of corresponding reference pixels located on the second reconstructed reference line bordering the current block and the identified pivot reference pixel on the extension of the first reconstructed reference line bordering the current block; and
    predicting a pixel of the current block using the plurality of predicted pixels on the third reference line bordering the current block.

2. The method of claim 1, wherein predicting the plurality of pixels on the third reference line further comprising:
    for a pixel on the third reference line, identifying a corresponding reference pixel on the second reconstructed reference line; and
    interpolating a predicted value of the pixel on the third reference line based on a value of the corresponding reference pixel on the second reconstructed reference line and a value of the pivot reference pixel.

3. The method of claim 1, wherein the third reference line is located on the opposite side of the second reconstructed reference line of the current block.

4. The method of claim 1, wherein the current block comprises a prediction unit.

5. The method of claim 1 further comprising predicting a second pixel of the current block using at least one of the plurality of predicted pixels on the third reference line associated with the current block, a plurality of pixels on the first reconstructed reference line, or a plurality of pixels on the second reconstructed reference line.

6. The method of claim 1, wherein the pivot reference pixel is identified based on determining that a prediction mode for the current block is a planar reference line extension prediction mode.

7. The method of claim 6, wherein the prediction mode for the current block is determined based on an indication in the bitstream.

8. The method of claim 6, wherein the prediction mode for the current block is determined by deriving the prediction mode.

9. The method of claim 1, wherein the plurality of reconstructed pixels that extend beyond the current block belong to a neighboring block.

10. The method of claim 1 further comprising:
    predicting a second plurality of pixels on the third reference line by replicating one of the plurality of predicted pixels on the third reference line; and
    predicting a second pixel of the current block using the second plurality of predicted pixels on the third reference line bordering the current block.

11. An apparatus for video decoding comprising:
    a processor configured to:
    obtain a bitstream having a current block, the current block bordering a first reconstructed reference line, a second reconstructed reference line, and a third reference line to be predicted;
    identify a pivot reference pixel located on an extension of the first reconstructed reference line bordering the current block, the extension comprising a plurality of reconstructed pixels that extend beyond the current block;
    predict a plurality of pixels on the third reference line by interpolating based on a plurality of corresponding reference pixels located on the second reconstructed reference line bordering the current block and the identified pivot reference pixel on the extension of the first reconstructed reference line bordering the current block; and predict a pixel of the current block using the plurality of predicted pixels on the third reference line bordering the current block.

12. The apparatus of claim 11, wherein the processor for predicting the plurality of pixels on the third reference line is further configured to:
identify a corresponding reference pixel on the second reconstructed reference line for a pixel on the third reference line; and
interpolate a predicted value of the pixel on the third reference line based on a value of the corresponding reference pixel on the second reconstructed reference line and a value of the pivot reference pixel.

13. The apparatus of claim 11, wherein the third reference line is located on the opposite side of the second reconstructed reference line of the current block.

14. The apparatus of claim 11 further comprises predicting a second pixel of the current block using at least one of the plurality of predicted pixels on the third reference line associated with the current block, a plurality of pixels on the first reconstructed reference line, or a plurality of pixels on the second reconstructed reference line.

15. The apparatus of claim 11, wherein the pivot reference pixel is identified based on the processor configured to determine a prediction mode for the current block, wherein the prediction mode is a planar reference line extension prediction mode.

16. The apparatus of claim 15, wherein the prediction mode for the current block is determined based on an indication in the bitstream.

17. The apparatus of claim 15, wherein the prediction mode for the current block is determined by deriving the prediction mode.

18. The apparatus of claim 11, wherein the processor is further configured to:
predict a second plurality of pixels on the third reference line by replicating one of the plurality of predicted pixels on the third reference line; and
predict a second pixel of the current block using the second plurality of predicted pixels on the third reference line bordering the current block.

19. An apparatus for video encoding comprising: a processor configured to:
identify a current block, the current block bordering a first reconstructed reference line, a second reconstructed reference line, and a third reference line to be predicted;
identify a pivot reference pixel located on an extension of the first reconstructed reference line bordering the current block, the extension comprising a plurality of reconstructed pixels that extend beyond the current block;
predictive encode a plurality of pixels on the third reference line by interpolating based on a plurality of corresponding reference pixels located on the second reconstructed reference line bordering the current block and the identified pivot reference pixel on the extension of the first reconstructed reference line bordering the current block; and
predictive encode a pixel of the current block using the plurality of predicted pixels on the third reference line bordering the current block.

20. The apparatus for claim 19, wherein the third reference line is located on the opposite side of the second reconstructed reference line of the current block, and wherein the current block comprises a prediction unit.

* * * * *